United States Patent
Leonardi et al.

(10) Patent No.: US 8,233,526 B2
(45) Date of Patent: Jul. 31, 2012

(54) SCALABLE VIDEO CODING METHOD

(75) Inventors: Riccardo Leonardi, Brescia (IT);
Nicola Adami, Brescia (IT); Michele Brescianini, Brescia (IT); Alberto Signoroni, Brescia (IT)

(73) Assignee: Universita Degli Studi di Brescia, Brescia (IT)

( * ) Notice: Subject to any disclaimer, the term of this patent is extended or adjusted under 35 U.S.C. 154(b) by 1361 days.

(21) Appl. No.: 11/721,234

(22) PCT Filed: Oct. 12, 2005

(86) PCT No.: PCT/IT2005/000599
§ 371 (c)(1),
(2), (4) Date: Jul. 6, 2007

(87) PCT Pub. No.: WO2006/040793
PCT Pub. Date: Apr. 20, 2006

(65) Prior Publication Data
US 2009/0285306 A1 Nov. 19, 2009

(30) Foreign Application Priority Data
Oct. 15, 2004 (IT) .............................. MI2004A1971

(51) Int. Cl.
*H04N 7/26* (2006.01)
*H04N 5/14* (2006.01)
*G06K 9/00* (2006.01)
*G06K 9/62* (2006.01)

(52) U.S. Cl. ........ 375/240; 382/189; 382/209; 348/335; 348/581; 348/715; 348/699; 348/E5.066; 348/E5.077

(58) Field of Classification Search .................. 375/240
See application file for complete search history.

(56) References Cited

U.S. PATENT DOCUMENTS

| | | | |
|---|---|---|---|
| 6,519,284 B1 * | 2/2003 | Pesquet-Popescu et al. | 375/240.11 |
| 6,674,911 B1 * | 1/2004 | Pearlman et al. | 382/240 |
| 6,954,500 B2 * | 10/2005 | Bottreau | 375/240.16 |
| 7,450,771 B2 * | 11/2008 | Chen et al. | 382/240 |
| 7,512,179 B2 * | 3/2009 | Sanson et al. | 375/240.12 |
| 7,573,491 B2 * | 8/2009 | Hartkop et al. | 345/672 |
| 2006/0239345 A1 * | 10/2006 | Taubman et al. | 375/240.03 |

OTHER PUBLICATIONS

Grünschloβ, L., 'Motion Blur', Faculty of Engineering and Computer Sciences, Ulm University, Germany, Apr. 3, 2008, entire document, http://gruenschloss.org/motion-blur/motion-blur.pdf.*

Andreopoulos et al.; "Spatio-temporal-snr scalable wavelet coding with motion compensated dct base-laver architectures"; Proceedings 2003 International Conference on Image Processing; ICIP-2003; Barcelona, Spain; Sep. 14-17, 2003; International Conference on Image Processing, New York, NY; IEEE, US; vol. 2 of 3; pp. 795-798; XP010669923.

Taubman; "Successive refinement of video: fundamental issues, past efforts, and"; Proceeding of the Spie; Spie, Bellingham, VA, US; vol. 5150, No. 1; 2003; pp. 649-663; XP002306316.

(Continued)

*Primary Examiner* — Christian Laforgia
*Assistant Examiner* — Ronald Baum
(74) *Attorney, Agent, or Firm* — Shoemaker and Mattare

(57) ABSTRACT

A method of scalable video coding in which the video signal is processed and coded at various layers of spatial resolution where between each pair of spatial layers a prediction mechanism is enabled which allows a comparison at homologous layers of spatial resolution with the aim to obtain a good efficiency.

22 Claims, 17 Drawing Sheets

OTHER PUBLICATIONS

Adami et al.; "A fully scalable video coder with inter-scale wavelet prediction and morphological coding"; Proceedings of the Spie—The International Society for Optical Engineering, Visual Communications and Image Processing [online]; Spie, Bellingham, VA, US; vol. 5960; Jul. 12, 2005; pp. 535-546; XP002363204.

Adami et al.; "SVC CE1: STool—a native spatially scalable approach to SVC, Document MPEG2004/M11368"; International Organization for Standardisation, ISO/IEC JTC1/SC29/WG11—Coding of Moving Pictures and Audio; Palma de Mallorca, Spain; Oct. 18, 2004; pp. 1-7; XP002363205.

* cited by examiner

SCALABLE VIDEO CODING METHOD

FIELD OF THE INVENTION

The invention refers to the systems that need to exchange information in the form of a numerical video signal (videotelephony (mobile), videocommunications (mobile), terrestrial digital TV, satellite digital TV, DVD, video streaming, video-on-demand . . . ) and refers in particular to a mechanism of cross-prediction between various spatial resolution representations of a same video signal to be used within a process of coding/decoding of the same video signal in order to ensure a full spatial, temporal and reconstruction quality scalability, starting from a single compressed stream.

BACKGROUND OF THE INVENTION

Temporal sequences of images acquired and represented in numerical format are commonly called digital video signals. In today's information society, the compression of video signals is a necessary operation to enable and/or to facilitate the recording of such signals or their distant communication. The compression in fact is applied to reduce the number of recording unit (commonly bit) for the digital representation of the video signal, which in turns lends to a reduction of the bit-rate that is necessary for the transmission of the same signal on a digital communication channel.

The compression or coding system receives an incoming video signal and returns a bit stream of an inferior size with respect to the size (expressed in bits) of the original signal. It is typically possible "to trade" a smaller compressed bit-stream at the expense of a lower reconstruction quality of the data after the inverse operation, called decompression or better decoding.

The coding is carried out, by who holds the original signal, by means of a system said encoder, while decoding is performed by the receiver by means of a system called decoder. Normally the original video signal has spatial (coordinates x and y) and temporal (rhythm of images per second, or frame rate) characteristics that are not changed by the coding and decoding process that operates at a so-called working point defined by an appropriate quality of the decoded data. The most spread standards for video compression work according to this paradigm, as an example those pertaining to the MPEG or the H.26x families.

Such a paradigm becomes obsolete in the context of Scalable Video Coding (SVC). In such a context, the coded data with respect to a certain working point can be decoded according to a not necessarily defined a priori large number of working points so called inferior, in the sense that they can be decoded from only a fraction of the originally coded bit-stream. Such working points allow not only to reconstruct (to decode) the video signal with a scaled, reduced quality, spatial dimension (or resolution) and frame rate with respect to the signal that can be decoded from the whole compressed bit-stream.

FIG. 1 shows a typical SVC system. The example refers to the coding of a video signal at an original CIF spatial resolution and a rate of 30 fps (images or "frames" per second). The scalable encoder typically produces a bit-stream where it is possible to determine one or more portions referring to the texture information, typically corresponding to static image coding, and optionally one or more portions referring to motion information (typically represented by a motion vector field) used in coding of motion-compensated temporal prediction operations. In the example, the originally coded stream is generated according to a bit rate equal to 2 megabits per second (2 Mbps), such rate being linked to a maximum layer of quality chosen for the original spatial and temporal resolutions. For a scaled decoding in terms of spatial and/or temporal and/or quality resolution, the decoder only works on a portion of the original coded bit stream according to the indication of the desired working point. Such stream portion is extracted from the originally coded stream by a block called "extractor" which in FIG. 1 is arranged between the encoder and the decoder and which in general, according to the application filed, can represent an independent block of the whole chain or it can be an integral part of the encoder or decoder. The extractor receives the information referring to the desired working point (in the example of FIG. 1, a lower spatial resolution QCIF, a lower frame rate (15 fps), and a lower bit rate (quality) (150 kilobit per second) and extracts a decodable bit stream matching or almost matching the specifications of the indicated working point. The difference between an SVC system and a transcoding system is the low complexity of the extraction block that does not require coding/decoding operations and that typically consists in simple "cut and paste" operations.

The application scenarios that can benefit from SVC are numerous, as an example the production and distribution of video over communication channels of diverse capacity, and for receiving terminal devices with different spatial or temporal resolution capability (television, cellular videophones, palm-desktop . . . ); video streaming on heterogeneous IP (Internet Protocol) networks; advanced tele-surveillance systems; videoconferencing applications with non guaranteed bandwidth; video streaming on mobile networks; fast video archives query and retrieval; and others.

Recently a strong interest has been focused around SVC coding solutions also thanks to important technological advances that enable spatial as well as temporal scalability, the most important one likely being both spatial and temporal wavelet transform, this last one in its motion compensated version.

Within the scientific community and above all as a result of an explorative work made within working groups operating in the standardization organization ISO-MPEG, it has been possible to reach a classification of SVC systems according to the order in which the aforesaid transformations are applied to the original data. Scope of the present invention is that to propose a method of coding and of decoding of video signals that allows overcoming some limits of state-of-the-art SVC architectures and at the same time to give competitive if not improved coding performances with respect to the current state-of-the-art in video coding.

SUMMARY OF THE INVENTION

The idea at the base of the present invention regards a new SVC system architecture in which a video signal is processed and coded at various layers of spatial resolution where between pairs of spatial layers a prediction mechanism is enabled which allows a comparison between homologous spatial resolution layers to obtain a good coding efficiency.

The basic idea will be further detailed and analysed in a series of preferred embodiments to investigate the basis idea itself and/or exemplify possible embodiments thereof.

The possible SVC systems resulting from the idea at the basis of the present invention intrinsically exhibit spatial scalability features.

A further aspect of the invention relates to a coding mechanism aimed at enabling temporal scalability features. The idea at the basis of such mechanism is to jointly code information portions resulting from the video signal and belonging to a homogeneous temporal resolution. Even though it could be taken into consideration in a generic SVC system, the application of such mechanism is preferred in the architectures subordinate to the basic idea of the present invention. In accordance with a preferred embodiment, an adaptation of a morphological coding technique known in the literature according to the idea at the basis of the above mechanism shall be illustrated.

An ulterior aspect of the invention refers to a coding stream partitioning representation system suitable for being submitted to the decoding method of the present invention.

The above system comprises indexing mechanisms that permit a coding stream partitioning with the aim of actually allowing to determine the stream that must be associated to a certain working point in terms of spatial and temporal resolution, and that possibly allow to satisfy some given maximum coding-decoding delay requirements.

Even though it could be taken into consideration in a generic SVC system, the application of such coding stream partitioning representation system is preferred in the architectures subordinate to the basic idea of the present invention. In accordance with a preferred embodiment of said partitioning representation system, an embodiment shall be illustrated which is based on the morphological coding algorithm described above and used in an SVC architecture complying to the basis of the present invention. Such embodiment and all those arising from the mentioned ideas, allows an effective extraction of a decodable stream relative to a given working point and also enables and makes effective the possibility of carrying out a multiplicity of further concatenated extractions according to admissible paths among dependent working points.

BRIEF DESCRIPTION OF THE DRAWINGS

The characteristics and the advantages of the coding and decoding method according to the invention will result more apparent from the indicative and non limiting description of preferred examples of realization, with reference to the attached drawings, in which.

DETAILED DESCRIPTION OF THE INVENTION

Figure 1:
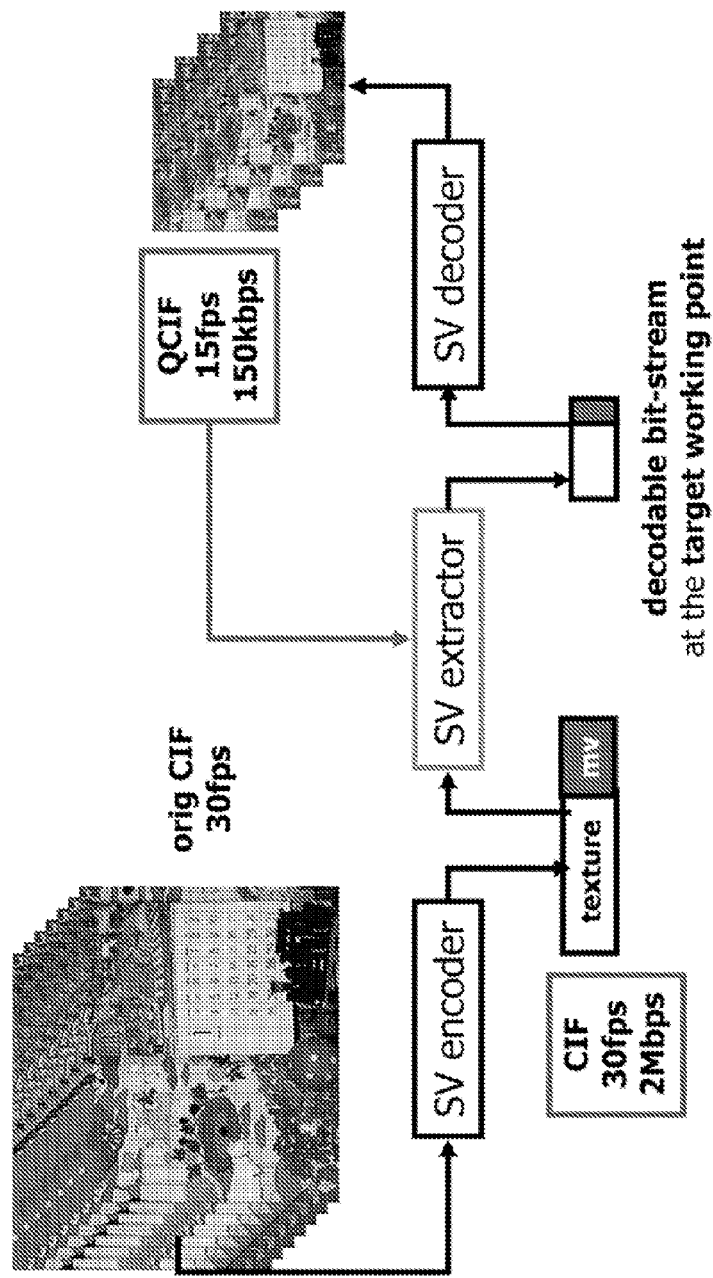
FIG. 1 represents a block diagram of a generic scalable video coding system SVC according to the prior art, including the coding, extractor and decoding blocks.
Figure 2:
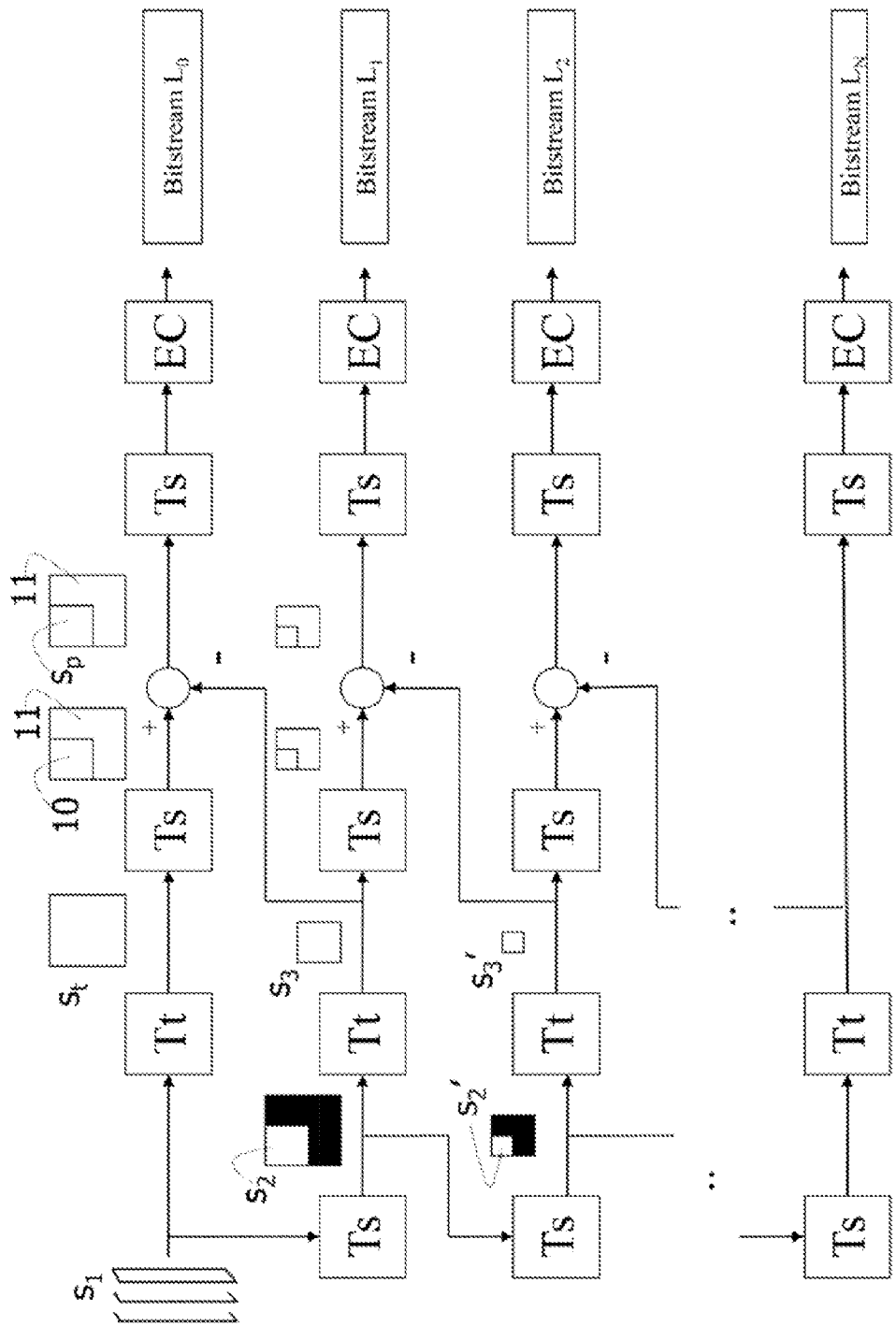
FIG. 2 represents a block diagram that illustrates the fundamentals of the encoder according to the present invention.
Figure 3:
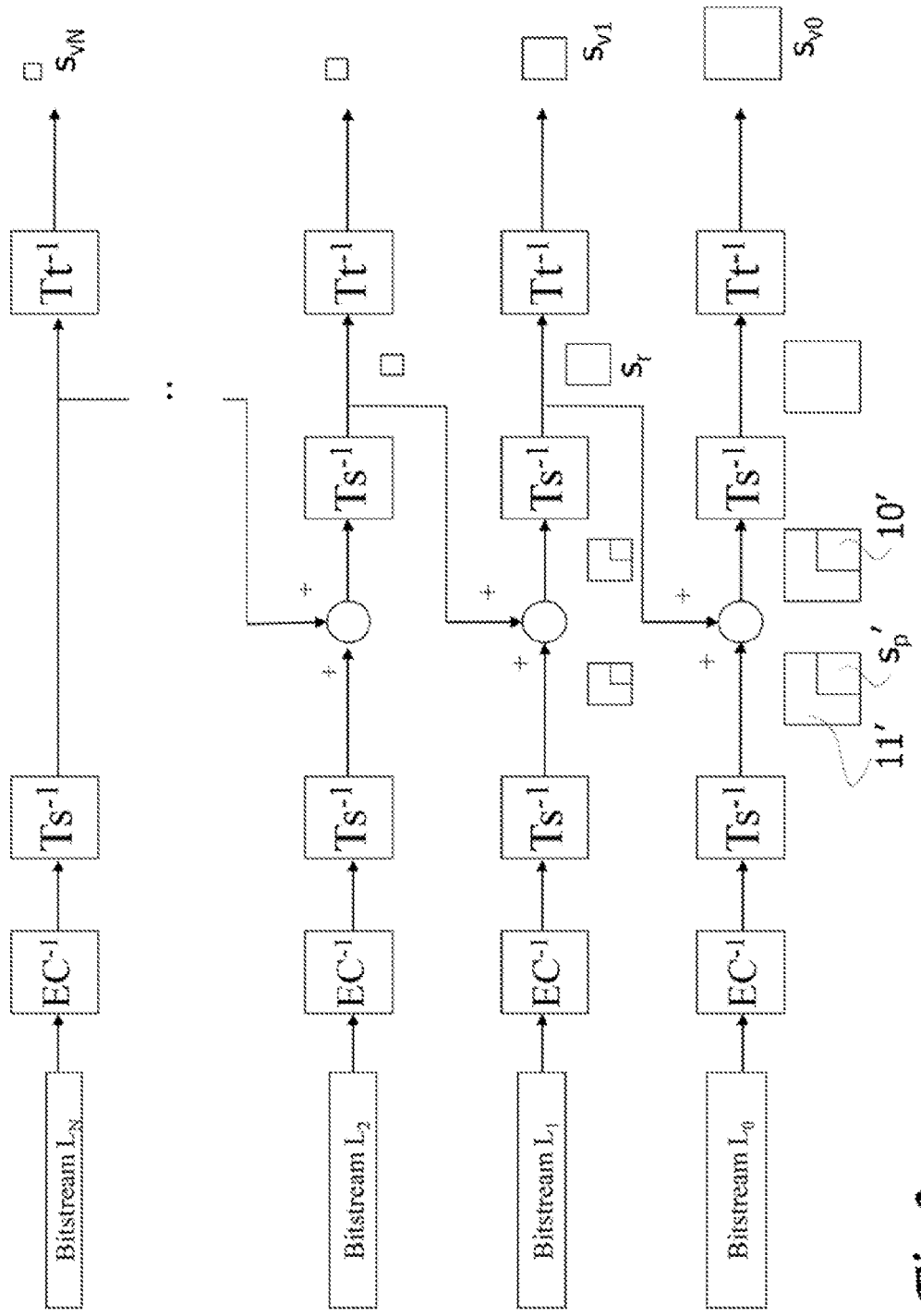
FIG. 3 represents a block diagram that illustrates the fundamentals of the decoder associated to the encoder.

The general principles of operation that govern the process of coding are described from the schemes reported in FIGS. 2 and 3.

The coding method comprises in succession the phases of:

a) generating representations of the video signal at various spatial resolutions;

b) temporally transforming said representations;

c) executing an operation of prediction between such temporal transform by putting in correspondence the information inherent to homologous spatial resolutions; and d) entropy coding according to appropriate scalability criteria, the resulting information beginning from a first reference layer, called base-layer.

With reference to the scheme of FIG. 2, the original video signal, indicated with s1, is spatially filtered (blocks Ts), first column on the left of the scheme, generating the signals s2, s2'... that represent versions of the original images at gradually decreasing spatial resolutions.

The signals thus obtained are filtered carrying out a temporal transformation (Tt), which generates signals St, S3, S3', ..., followed by a further spatial transformation (Ts) suitable for generating a digital signal comprising a first component 10 and a second component 11, where said components 10, 11 in combination represent the same information contents as signals St, S3, S3', .... The transformation Ts, moreover, generates the first component 10 so that it substantially has the same spatial resolution as the digital signal S3, S3', ....

Considering now the output signal from block Ts of the generic layer n, where n coincides with the number of spatial transformations applied in the beginning phase of the process, the signal s3, s3', ... coming from the output of the temporal module (Tt) at the layer n+1 is used in order to predict the portion of information 10 that is compatible to it and generate a prediction error signal Sp. Such operation is represented in FIG. 2 by the difference node between the first component 10 and signal S3. The signals thus obtained undergo a successive spatial transformation (Ts) and finally an entropic coding (EC) is applied which generates the final coded bit-stream. The entropy coding block provides a lossless or lossy compressed version of the incoming data.

With respect to the coding procedure, the decoding method works in a dual way (FIG. 3). The coded bit streams undergo an entropy decoding and then an inverse spatial transformation ($Ts^{-1}$) that brings to the generation of a signal Sp' representative of the prediction error signal Sp and a signal 11' representative of the second component 11 of the digital signal. By signal representative of a reference signal it is meant a signal exhibiting spatial, temporal and quality features not differing from those of the reference signal by such an amount as to impair a useful usage thereof or a usage according to the system operating principles.

Considering now the signals pertaining to the generic layer n, where n coincides with the number of spatial transformations executed in the beginning phase of the process, the signal Sr coming from the output of the inverse spatial module relative to the layer n+1, is used in order to reconstruct the complete information related to the signal of the layer n. Such an operation is represented in FIG. 2 by the addition node that allows obtaining the signal (10', 11') starting from signals (Sp',11') and Sr. Therefore, the signals resulting from this operation undergo an optional inverse spatial transformation ($Ts^{-1}$) that generates signal St' representing signal St, and subsequently an inverse temporal transformation ($Tt^{-1}$). In such a way the video signals Sv0, Sv1 ... Svn are obtained at several spatial resolutions.

It should be noted that at the basic layer (bit stream LN), the second inverse spatial transformation ($Ts^{-1}$) is not present.

The prediction can be defined as "crossed" because the video signals at various spatial resolutions undergo a transformation before being predicted from a layer of spatial resolution to the other. In other words, and according to a preferred implementation, to the signal obtained from a temporal transformation of the video at a certain layer of spatial resolution (said reference layer) a spatial transformation is applied so that it allows to identify (some) data at the same spatial resolution of the signal obtained by temporally transforming the video at a different layer of spatial resolution. A prediction can therefore be operated between the so obtained temporal representations, thus reducing the amount of information to be coded. Such prediction between signals with the same spatial resolution (such as s3 and 10), represented by the difference node in FIG. 2, is to be understood in a general meaning and comprising the prediction methods commonly used for coding. Examples thereof are the open loop prediction that is based on the direct comparison of signals S3 and 10 and the closed loop prediction based on the comparison between a lossy version of S3 (typically compressed and decompressed at a certain quality layer) and signal 10, so as to allow the decoder to faithfully compensate the prediction operated. These choices do not interfere with the nature of the "crossed" prediction idea. In the encoder, the residual information generated at different layers of spatial resolution is entropy coded using a procedure of prioritization of the coding stream that guarantees a complete scalability in terms of quality. The described principle of crossed prediction can be similarly applied to all the remaining layers of spatial resolution of the video signal to be coded, either by starting from the original data layer, or from a different reference data layer. As far as the principle of crossed prediction is concerned, the decoder operates in a dual way with respect to the encoder. As described below, the decoder can also decode fractions of the coded stream in case it is desired to reconstruct a single video stream to a wished quality level, and to a particular temporal and spatial resolution.

Figure 4:
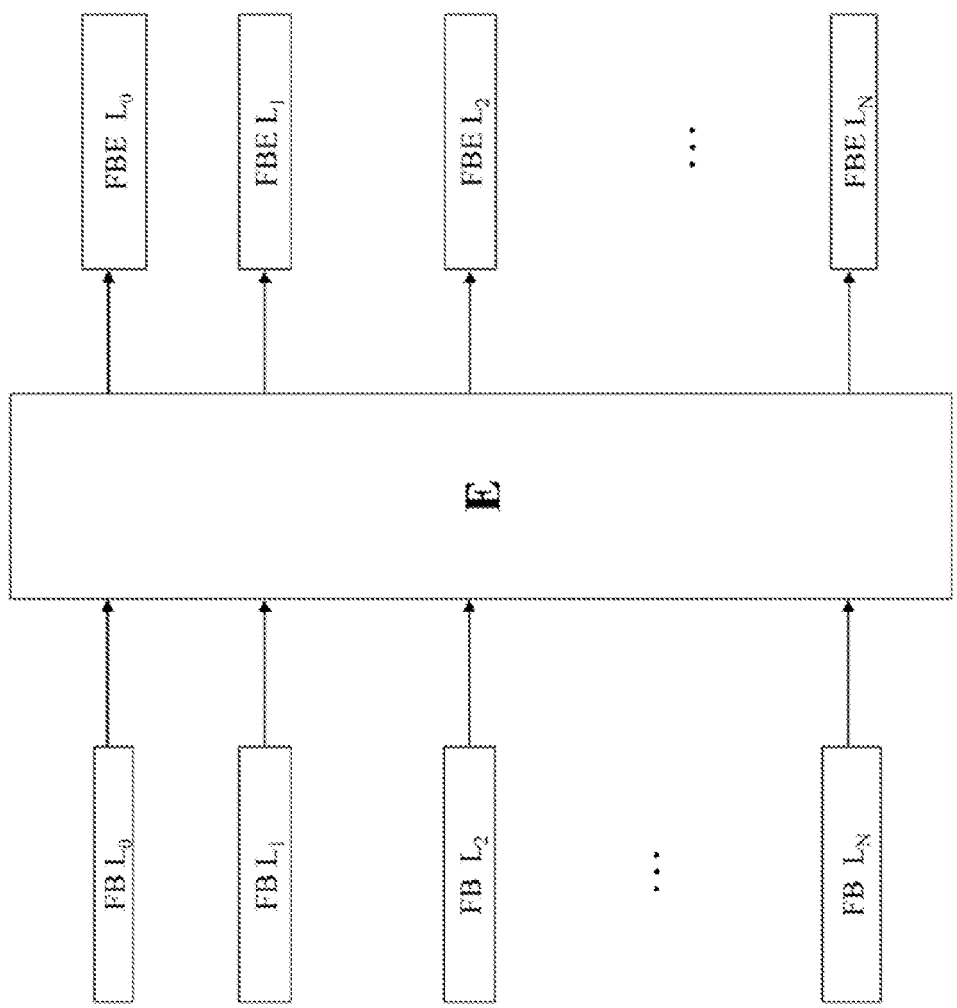
FIG. 4 schematically illustrates the extractor block only.

FIG. 4 shows the possible action of the "extractor" block E which, as already said, in an SVC system, is arranged between the encoder and the decoder and which in general, according to the applications, can be constructed as an independent block or as an integral part of the encoder or of the decoder. Thus, the incoming bit streams in FIG. 3 can be interpreted as processed by the extractor block E and thus the corresponding decoded signals can be regarded as lossy versions of the coded ones but to be used in an "equivalent" manner.

By decoded equivalent signal, or signal to be used in an equivalent manner as compared to the corresponding signal in the encoder (or reference signal) it is meant a signal having a quality, resulting from a choice on the number of decoded bits, which approaches the quality of the reference signal so as to be used in replacement thereof. Typically, the equivalent signal exhibits a smaller number of bits than the number of bits of the reference signal, the number of discarded bits could otherwise be used to ensure a proper operation or improve the performance of the scalable coding/decoding system.

The presence or not of an extractor does not interfere with the nature of the basic idea of this invention. However, the architectures of the resulting SVC systems allow detecting innovative solutions that relate to the actions and structure of the extractor, which shall be illustrated as further aspects of the present invention.

Figure 5:
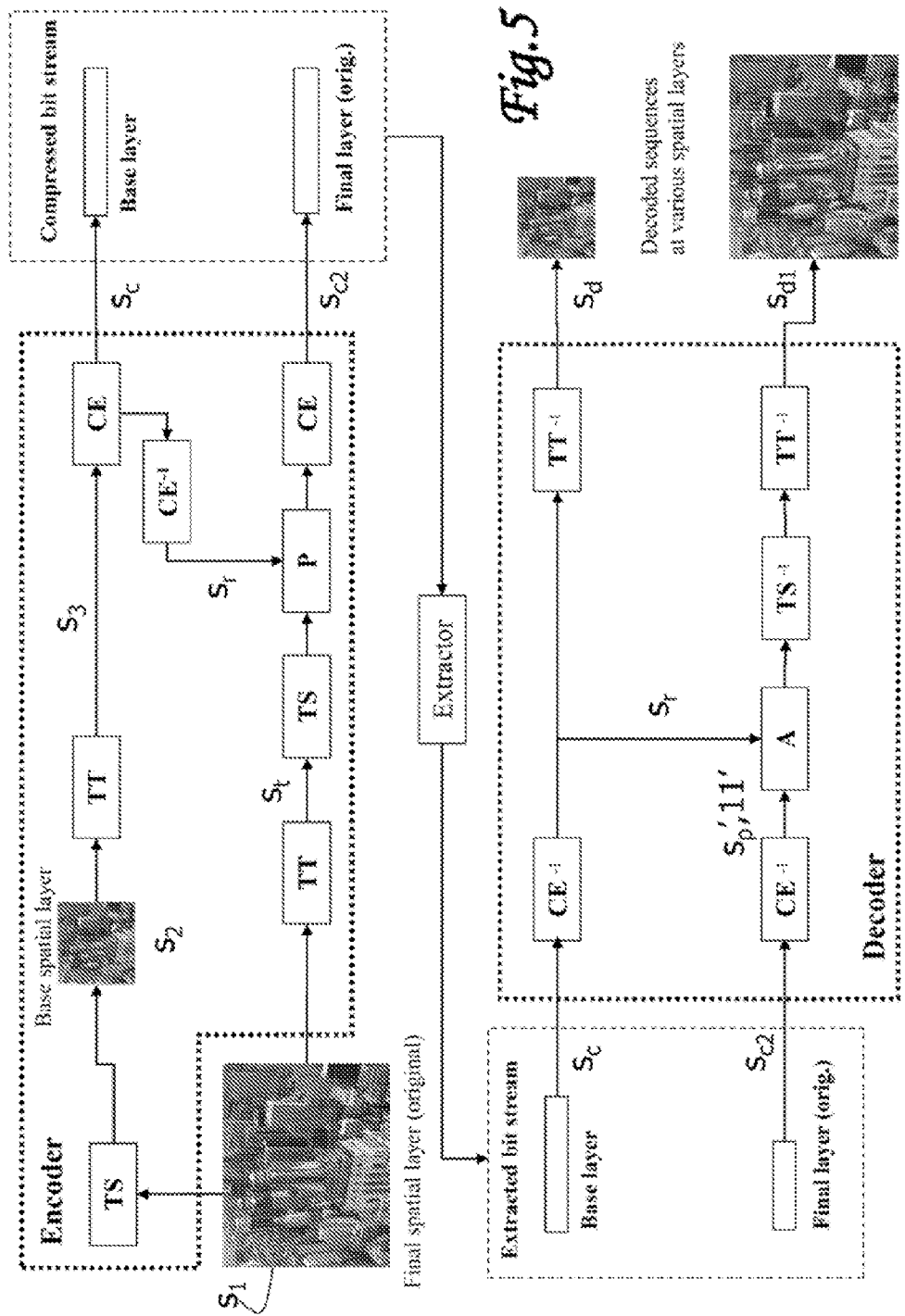
FIG. 5 represents a block diagram of an embodiment of a two layer coding and decoding method according to the invention.
Figure 5A:
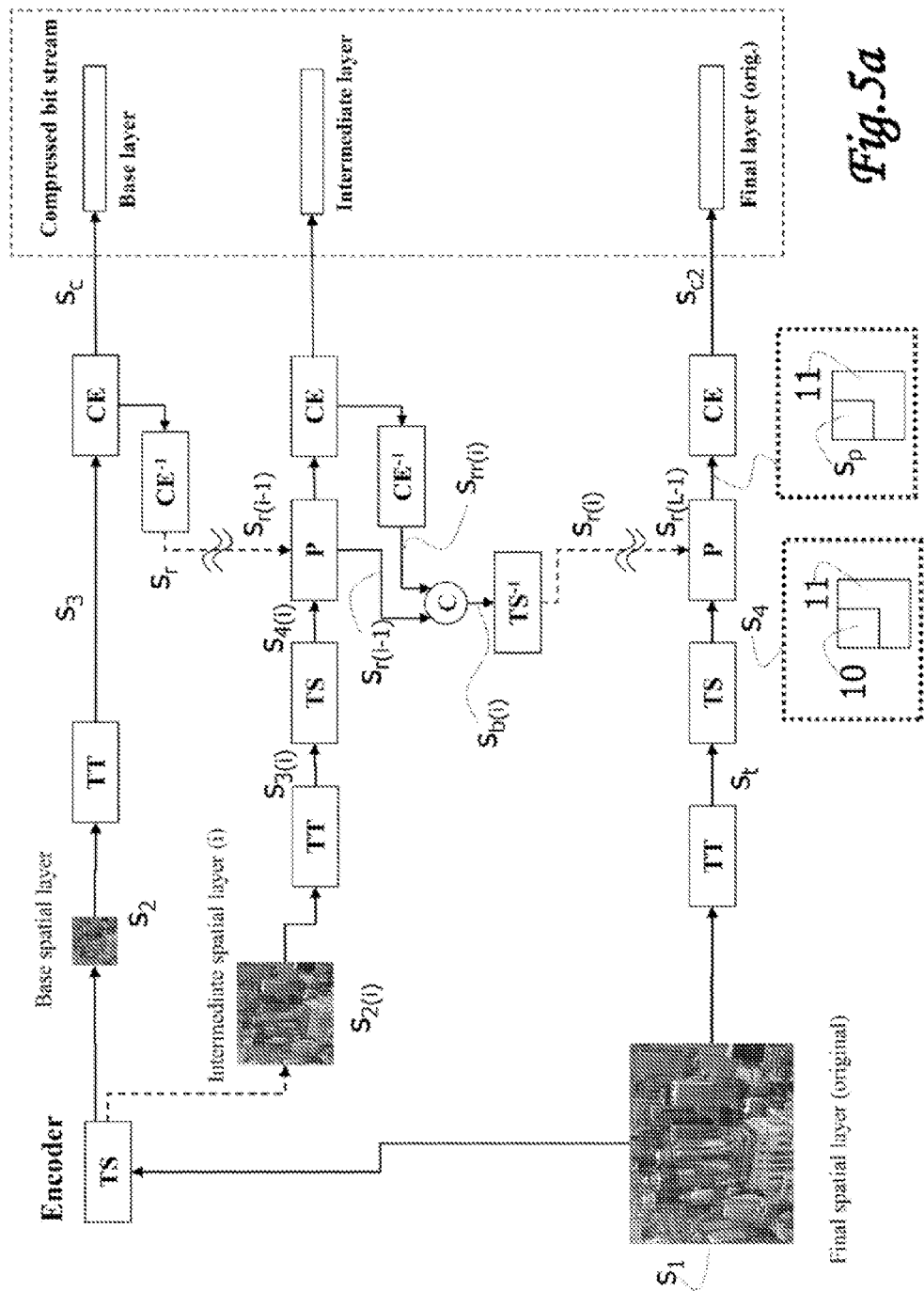
FIGS. 5a and 5b show block diagrams of the coding and decoding method of FIG. 5, but with three layers.
Figure 5B:
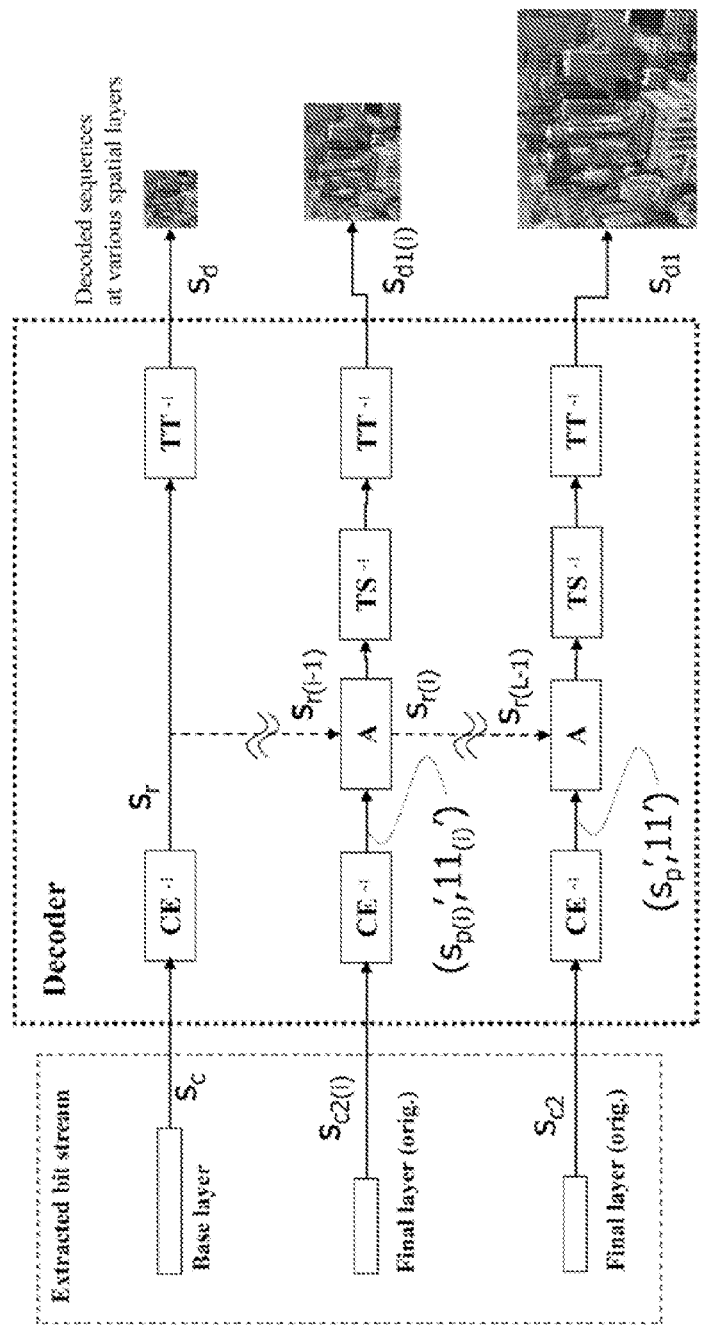

FIGS. 5-5b show examples of a coding and decoding method according to the present invention. For higher clarity of description, the following description of the diagram of FIG. 5 does not comprise the action of the extractor block, which shall be better described hereinafter.

The coding method comprises the following phases:

a) acquiring a first digital signal (S1) representative of a video signal, said digital signal comprising a sequence of numerical images;

b) operating a transformation (TS) of said first digital signal (S1) in order to generate at least a second digital video signal (S2) having a different spatial resolution with respect to that of said first digital signal (S1);

c) carrying out a transformation (TT) of the at least second digital video signal (s2) generating a third digital signal (S3), said transformation (TT) leaving substantially unchanged said spatial resolution of the second digital signal video (S2). As substantially unchanged spatial resolution is intended that she signal endured a variation of spatial information which remains inferior, as an example, to 20%;

d) operating a compression (CE) of said third digital signal (S3) in order to generate a first digital compressed signal (Sc);

e) operating a transformation ($CE^{-1}$) of said first digital compressed signal (Sc) in order to generate a reconstructed signal (Sr) equivalent to that obtainable by means of a decompression of the said first digitally compressed signal (Sc);

f) carrying out a processing of the first digital video signal (S1), which comprises a transformation (TT) of the kind of the transformation of phase c), in order to generate a digital signal (St);

g) carrying out a transformation (TS) of said signal (St) of the kind of the transformation of phase b) in order to obtain a digital signal (S4) which comprises a first component (10) and a second component (11), wherein said first and second components represent in their combination the same informative content of the digital signal (St), said transformation (TS) being adapted to generate said first component (10) so that it has substantially the same spatial resolution of the digital signal (S3);

h) generating a prediction error signal (Sp) representative of the difference between said first component (10) and the reconstructed signal (Sr); and i) carrying out an operation of compression (CE) of said prediction error signal (Sp) and of said second component (11) in order to generate a second digital compressed signal (Sc2).

In the case of FIG. 5a, wherein at step b), two or more video signals are generated (s2, s2(1), ..., s2(i), ..., s2(L−1)) having a spatial resolution differing from that of said first digital signal (s1), the reconstructed signal (Sr) used in step h) is obtained from the sequence of the following steps, repeated for each signal (s2(i)) at an intermediate spatial resolution (i):

a(i)) carrying out a transformation (TT) of the video digital signal at intermediate spatial resolution (S2(i)) generating a third digital signal (S3(i)), said transformation leaving said spatial resolution of the video digital signal at intermediate spatial resolution (s2(i)) substantially unchanged;

b(i)) carrying out a transformation (TS) of at least one portion of said signal at intermediate spatial layer (S3(i)) of the kind of the transformation of the phase b) in order to obtain a digital signal (S4(i)) comprising a first component (10(i)) and a second component (11(i)), where said first and second components represent combined the same informative content of the at least one portion of said digital signal (S3(i)), said transformation (TS) being adapted to generate said first component (10(i)) so that it has substantially the same spatial resolution as the digital signal (s3(i−1), where s3(0)=s3);

c(i)) generating a prediction error signal (Sp(i)) representative of the difference between said first component (10(i)) and at least one portion of the reconstructed signal (Sr(i−1)), where Sr(0)=Sr corresponding to the portion of signal (S3(i));

d(i)) carrying out an operation of compression (CE) of said prediction error signal (Sp(i)) and of said second component (11(i)) in order to generate a digital compressed signal at intermediate layer (Sc(i));

e(i)) operating a transformation (CE$^{-1}$) of said digital compressed signal at intermediate layer (Sc(i)) in order to generate a residual reconstructed signal (Srr(i)) equivalent to that obtainable by means of a decompression of said digital compressed signal at intermediate layer (Sc(i));

f(i)) operating a combination (C) of said reconstructed residual signal Srr(i) and of the reconstructed signal at a previous spatial layer Sr(i−1) which preserves the layers of spatial resolution of the above signals for generating a combined signal Sb(i) and g(i)) operating a transformation (TS$^{-1}$) of said combined signal Sb(i), said transformation (TS$^{-1}$) being able to generate a reconstructed signal at intermediate layer Sr(i) so that it substantially has the same spatial resolution as the digital signal (s3(i)).

The decoding method shown in FIG. 5 and associated to the above described coding method comprises the following phases:

a) acquiring a digital signal comprising at least the first and the second digital compressed signals (Sc, Sc2);

b) carrying out an operation of decompression (CE$^{-1}$) of said first digital compressed signal (Sc) in order to obtain the reconstructed signal (Sr);

c) carrying out a transformation (TT$^{-1}$) of said reconstructed signal (Sr) in order to generate a decoded signal (Sd) representative of the second digital video signal (S2);

d) carrying out an operation of decompression (CE$^{-1}$) of said second digital compressed signal (Sc2) in order to reconstruct a signal (Sp') representative of the prediction error signal (Sp) and a signal 11' representative of the second component 11 of the digital signal (S4);

e) carrying out a sum between said signal (Sp') and said signal (Sr) in order to reconstruct a signal 10' representative of the first component 10 of the digital signal (S4);

f) carrying out a transformation (Ts$^{-1}$) of said signals 10', 11' in order to reconstruct a signal (St') representative of the digital signal (St); and g) carrying out a transformation (TT$^{-1}$) of said signal (St') in order to generate a decoded signal (Sd1) representative of the first digital video signal (S1).

In the case illustrated in FIG. 5b, wherein at step a) of the decoding method described above, besides the first signal (Sc; Sc'), two or more compressed signals are acquired (Sc2, Sc2(1), ..., Sc2(i); Sc2', Sc2(1)', ..., Sc2(i)') relating to different spatial resolutions and according to a predetermined order of such spatial resolutions, steps from d) to g) are repeated for each signal (Sc2(i); Sc2(i)') at intermediate spatial resolution (i). The reconstructed signal used in step e) to be added to the signal representative of the prediction error Sp'(i) is obtained through a composition of the decompressed signals (Sp', 11') belonging to all lower spatial resolutions and of the reconstructed signal Sr at the base layer.

In other words, starting from the original resolution, also said "final" because corresponding to the last refinement stage, different resolution video streams are extracted through a spatial transformation (TS). The lower resolution constitutes the "base" layer to which the coded stream, said "base-layer", is associated. The intermediate layers can be 0, 1 or more than one.

A temporal transform (TT) is applied for every layer of spatial resolution to the aim of uncorrelating data along the temporal direction.

Starting from the base layer an inter-layer relationships architectures is instantiated that foresee a prediction mechanism (P) of some data at the current layer of spatial resolution starting from an inferior layer of spatial resolution.

The block (CE) in FIGS. 5, 5a carries out the signal compression according to scalability features in terms of quality. In block (CE) there may be comprised spatiotemporal transformation operations, quantization and entropic coding of the coefficients produced at the different layers of spatial resolution.

To the aim to guarantee a correct updating (A) of the prediction during the decoding phase, it must be noted that the data coming from the lower spatial resolution layer and used for the prediction (P) are equivalent to those that will be available during the decoding (that is those decoded through CE$^{-1}$).

The coded bit-streams produced by the coding method and containing the compressed signals (Sc, Sc2) can be sent to a block called "Extractor" that extracts and recomposes a new coded stream in which, according to the technologies which are used, the various spatial layers can go through temporal resolution (frame rate) and/or quality scaling.

The decoder inverts the whole coding processing chain by giving back the decoded video streams at the various spatial resolutions according to the streams provided by the extractor.

The spatial scalability is just obtained by discarding, starting from a certain layer of interest (that becomes the final layer), all the coded streams of the layer at higher spatial resolution.

It must be noted that, to the aim to execute a prediction operation, it is necessary to confront data at the same layer of spatial resolution. This can happen, as an example, in two ways:

1) through an interpolation of the data to an higher spatial layer, 2) through a decimation of data at an higher resolution while activating a mechanism of conservation of the information discarded in phase of decimation (signals 10 and 11).

With particular reference to FIG. 5a, it should be noted that predictors P at higher layers of resolution (not strictly close to the base layer) will have to use all the decoded information from the lower layers and manage the appropriate inverse spatial transformations to obtain a signal Sr usefully comparable with signal 10.

Figure 6:
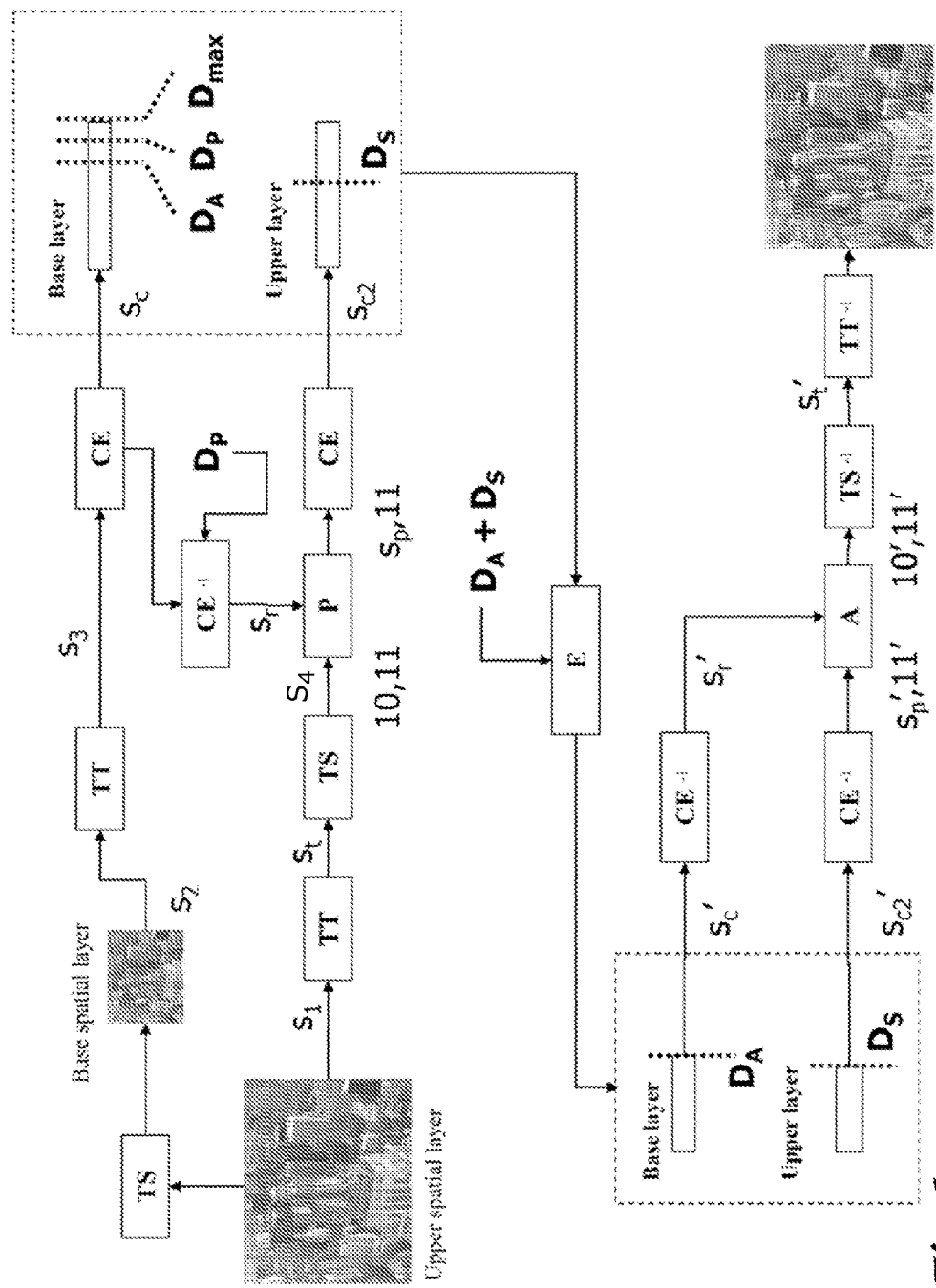
FIG. 6 shows an advantageous variation of the example of FIG. 5.

A further aspect of the invention, schematically illustrated in FIG. 6, relates to a mechanism for the non-synchronised management of the prediction in coding and updating in decoding operations to improve the performance of an SVC system according to the basic idea of the present invention. As mentioned above, the reconstructed signal Sr, that is, the signal S3 coded (block CE) and decoded (block $CE^{-1}$) in the coding step and used as base prediction layers of a higher spatial resolution layer, could not be exactly that (Sr') used in decoding to update the prediction error. The described degree of freedom can be useful for example to carry out a distribution of the lengths of the coded sub-streams at the various layers of resolution according to overall length constraints and with the aim of maximising, according to heuristic or quantitative methods, the quality of the reconstructed data relative to a set of one or more working points.

In accordance with an advantageous embodiment, the described mechanism is exemplified in FIG. 6 through a combined action of an SVC system like the one of FIG. 5 and an extractor block (E). The figure shows a two layer architecture (one prediction layer) similar to that shown in FIG. 5. For the stream coded at the base layer there are indicated three decoding points or length: Dmax greater than or equal to DP in turn greater than or equal to DA. Dmax is the length of the coded bit stream for the base layer corresponding to the maximum reconstruction quality. DP is the length corresponding to the stream portion of the base layer that is decoded (block $CE^{-1}$) to provide the signal Sr used by the encoder for the crossed prediction. It should be noted that DP does not necessarily coincide with Dmax. DA is the length corresponding to the stream portion of the base layer that is decoded to provide the signal Sr' used by the decoder for the crossed update. It should be noted that DA does not necessarily coincide with DP. Moreover, in the example, the selection of DA is taken from the extractor block according to an overall length constraint DA+DS or a set of constraints relating to various working points and comprising the constraint D=DA+DS for the specific working points considered herein. DS is the length corresponding to the stream portion of the higher layer that is decoded. In general, the decisional processes of distribution of the DA and DS values according to constraint D can be implemented also in a distributed way in the encoder and/or in the extractor and/or in the decoder and they can be realised through heuristics and/or in tabular form and/or through computational methods, without interfering with the nature of the further aspect of the invention just described.

The example can be easily generalised in the case of N layers of prediction, where each layer at a spatial resolution n is considered as a base layer for the prediction of the layer with spatial resolution n−1, where n coincides with the number of spatial transformations carried out in the initial process step.

Figure 8:
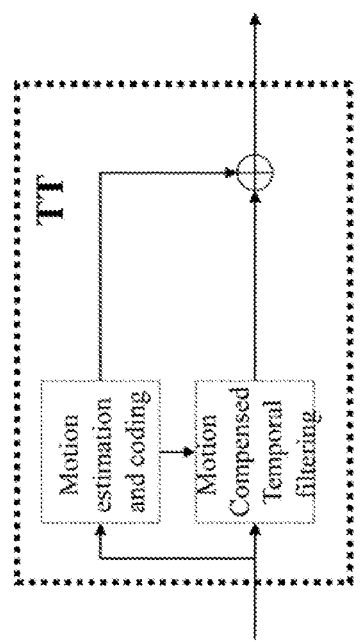
FIG. 8 represents a diagram of an example of embodiment of a temporal transform.
Figure 10:
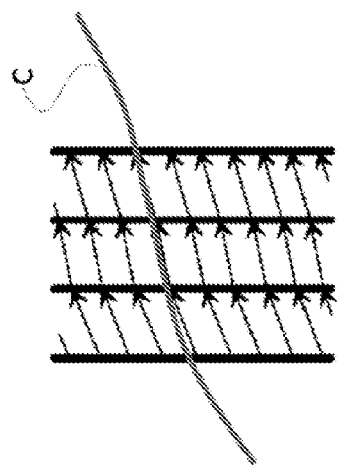
FIG. 10 is a graphical representation of the MCTF concept (motion compensated temporal filtering), in which the trajectory of filtering is performed along time so as to follow the direction of the motion fields.
Figure 9:
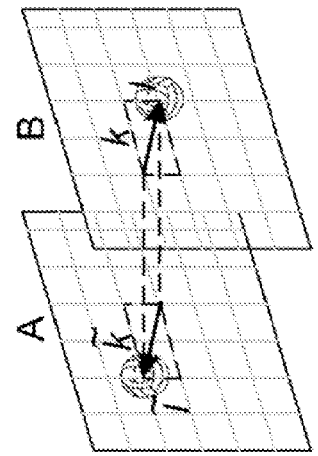
FIG. 9 is a graphical representation of direct and inverse motion vectors for the description of the movement of an object between two frames of a sequence of images (or video sequence)

According to a preferred embodiment, illustrated in FIGS. 8-10, of an SVC architecture according to the basic idea of the present invention, the block of temporal transform (TT) is realized with a motion-compensated temporal filtering (MCTF) technique. The operation of motion estimation produces for every pair of images, defined as "reference frame A—current frame B", a motion field, that can be expressed by motion vectors (in FIG. 9 the motion vectors that describe the movement of an object in motion are represented). The estimated motion field is coded to the aim of its compressed representation. The motion field is used from the wavelet filtering MCTF that with the aid of such information carries out a temporal decorrelation much more effective with respect to the single application of the normal wavelet filtering along the temporal direction. The data (frames) created from a MCTF wavelet transform, called temporal subbands, can be organized in layers of temporal resolution and it is such organization that enable the coding with temporal scalability. The principle of an MCTF filtering is represented in FIG. 10, where the curve (c) represents the trajectory followed by the filtering. Mathematically, two pixels taken at successive time instants (frame A and B) will come visited by the filter along the sequence of motion compensated coordinates (x, y, tA)−>(x+k, y+1, tB), rather than (x, y, tA)−>(x, y, tB). Details on occlusion issues and uncovered areas generated by objects in motion can be found in literature (e.g. [J. R. Ohm, "Three-Dimensional Subband Coding with Motion Compensation", IEEE Trans. On Image Processing, vol. 3, no. 5, pp. 572-588, September 1994; S. Choi and J. Woods, "Motion-compensated 3-D subband coding of video," IEEE Trans Image Processing, vol. 8, no. 2, pp. 155-167, February 1999]. In the proposed scheme MCTF filtering is carried out on every layer of resolution so that motion fields at different spatial resolutions are generated and coded. Scalable coding mechanisms of the motion vectors can be implemented so as to increase the performance of the SVC system.

Figure 7:
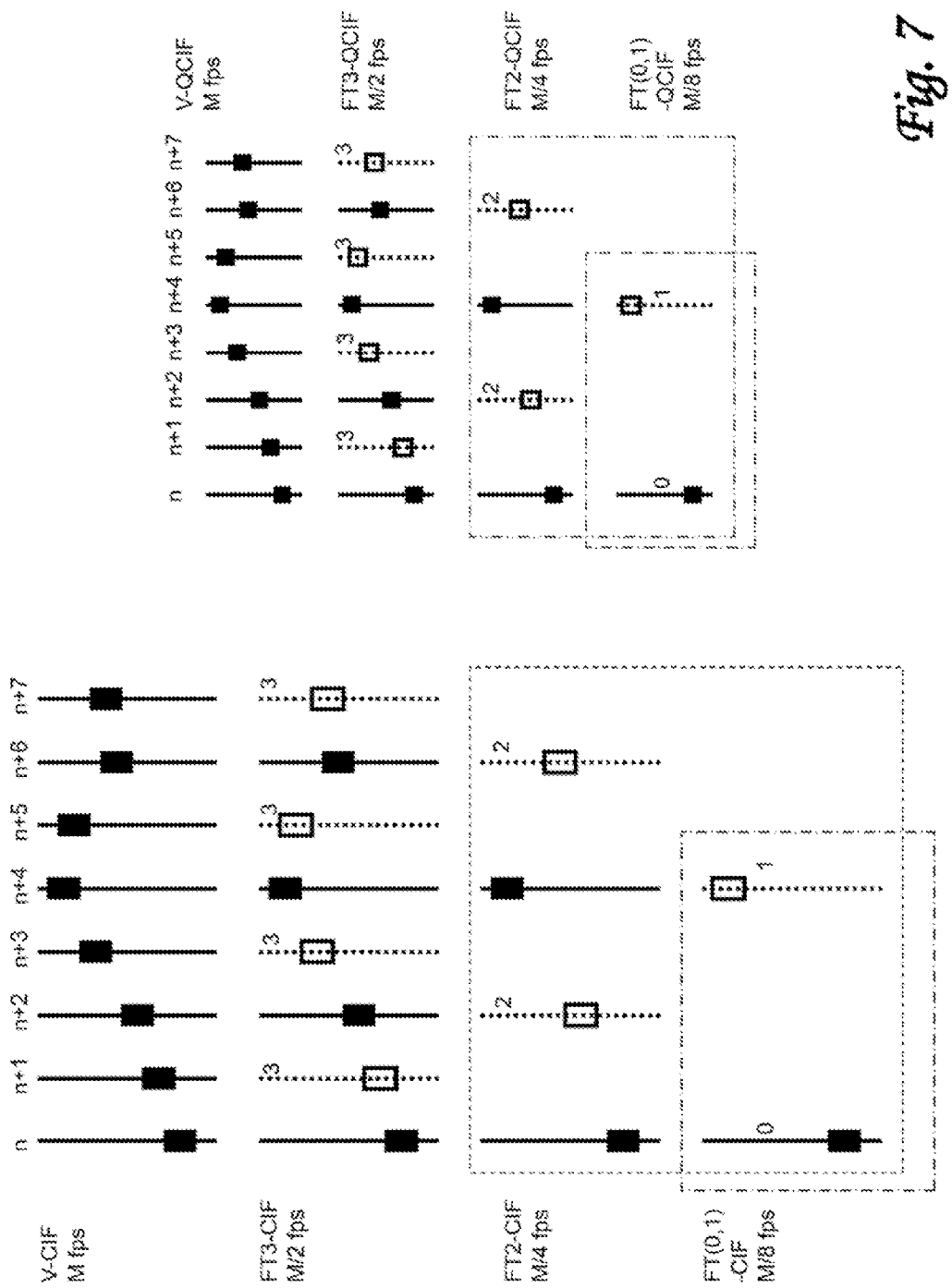
FIG. 7 shows a further advantageous embodiment of the coding method according to the present invention.

In accordance with an advantageous embodiment of the coding and decoding method, illustrated in FIG. 7, the information at a predetermined layer of spatial resolution can be predicted starting from the lower spatial layer according to an crossed prediction mechanism that operates according to two degrees of freedom:

1) crossed prediction on a subset of temporal frames
2) crossed prediction on a subset of the temporal decomposition layers.

FIG. 7 shows, for two different layers of spatial resolution (by way of an example, CIF and QCIF), the result of a temporal decomposition (by way of an example, an MCTF) on 3 layers. There are shown 8 video frames (V) at an initial temporal resolution of M fps and thereafter, three temporal decomposition layers (FTi). After the first decomposition, 8 temporal frames FT3 are obtained, of which 4 frames (or temporal subbands) at a temporal resolution M/2 and 4 detail frames (or temporal subbands) at layer of detail 3. The temporal decomposition is iterated only on the 4 frames at a resolution M/2 to obtain 4 temporal frames FT2 of which 2 frames at a temporal resolution M/4 and 2 detail frames at layer 2; similarly, an iteration is carried out on the 2 frames at a resolution M/4 to obtain one frame at a resolution M/8, called layer 0, and one detail frame at layer 1. The frame at layer 0 and the detail frames at layer 1, 2 and 3 together allow reconstructing signal V. To better understand the temporal references of the single transformed frames, on each frame there is shown a black rectangle representing a moving object. Such object is found on all frames at a low resolution and the corresponding detail information on all detail frames. The representation being discussed allows exemplifying the two degrees of freedom mentioned above and referred to the crossed prediction mechanism at the basis of the present invention:

1) the crossed prediction mechanism may relate to all the frames needed to reconstruct the video signal V or only a subset thereof; in the example of FIG. 7, the rectangle dashed as line-dots comprises, for the resolutions QCIF and CIF, the subsets of frames that could be involved in the crossed prediction.

2) The crossed prediction mechanism can be implemented also in the case the number of temporal decomposition layers for a lower spatial resolution layer is higher (in the example in FIG. 7, QCIF with 3 temporal layers, that is, all those shown) than that of a higher spatial resolution layer (in the example in FIG. 7, CIF with 1 temporal layer, that is, excluding those included in the rectangle dashed as line-line). Two solutions are possible in this case:

a. The temporal decomposition of the higher spatial resolution layer is anyway continued to implement an crossed prediction adapted to the temporal frames of the temporal decomposition layer of the lower spatial resolution. In the example in FIG. 7, the rectangle dashed as line-line shows the additional decomposition layers to reach the three layers required for the resolution QCIF.

b. The temporal decomposition of the lower spatial resolution layer is partly inverted to obtain an crossed prediction adapted to the temporal frames of the temporal decomposition layer of the higher spatial resolution. In the example in FIG. 7, the rectangle dashed as line-line shows the temporal decomposition layers to be inverted to reach the single layer required for the resolution CIF.

Figure 11:
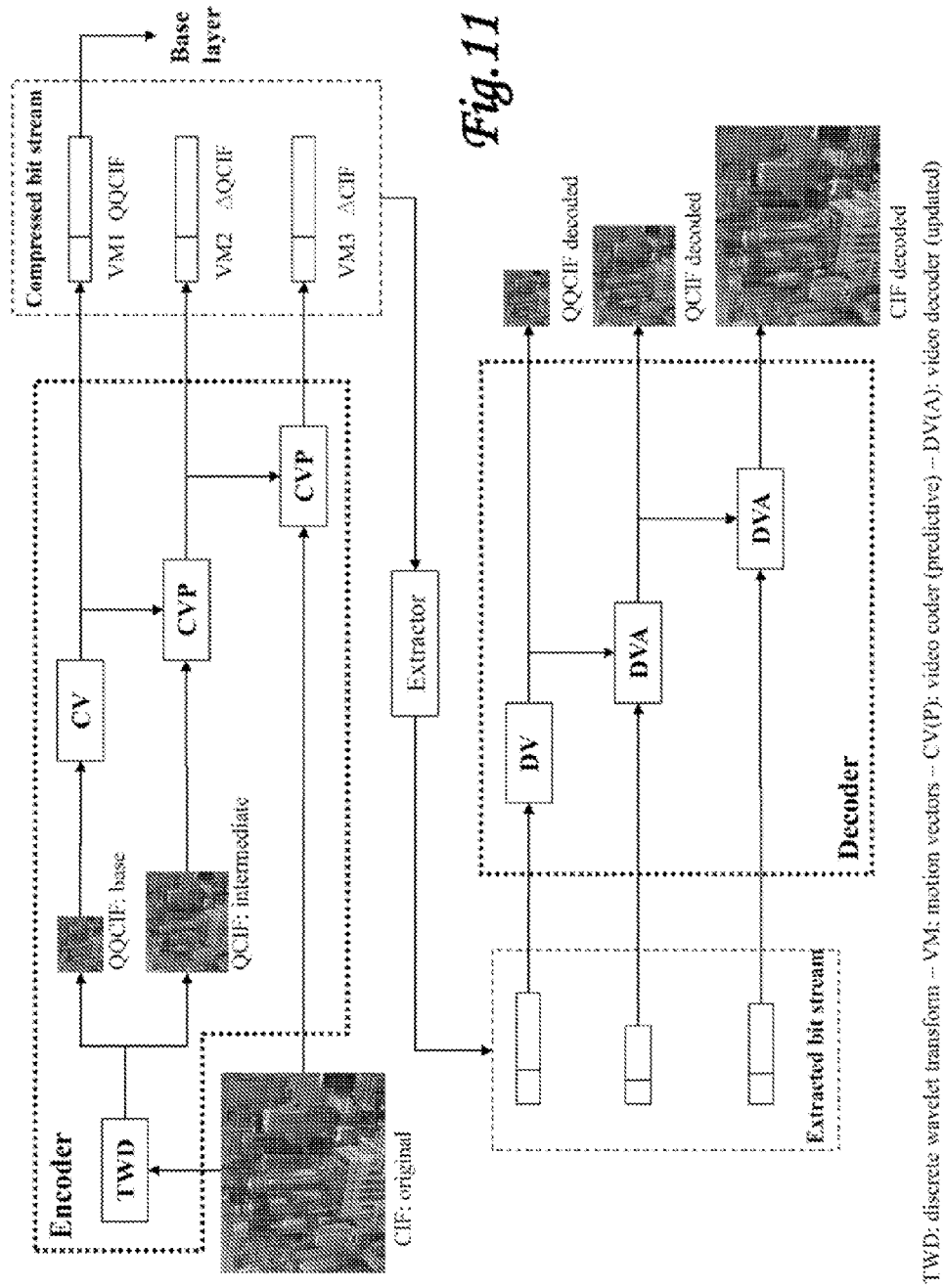
FIG. 11 represents a block diagram of an additional example of a coding and decoding method according to the invention.
Figure 12:
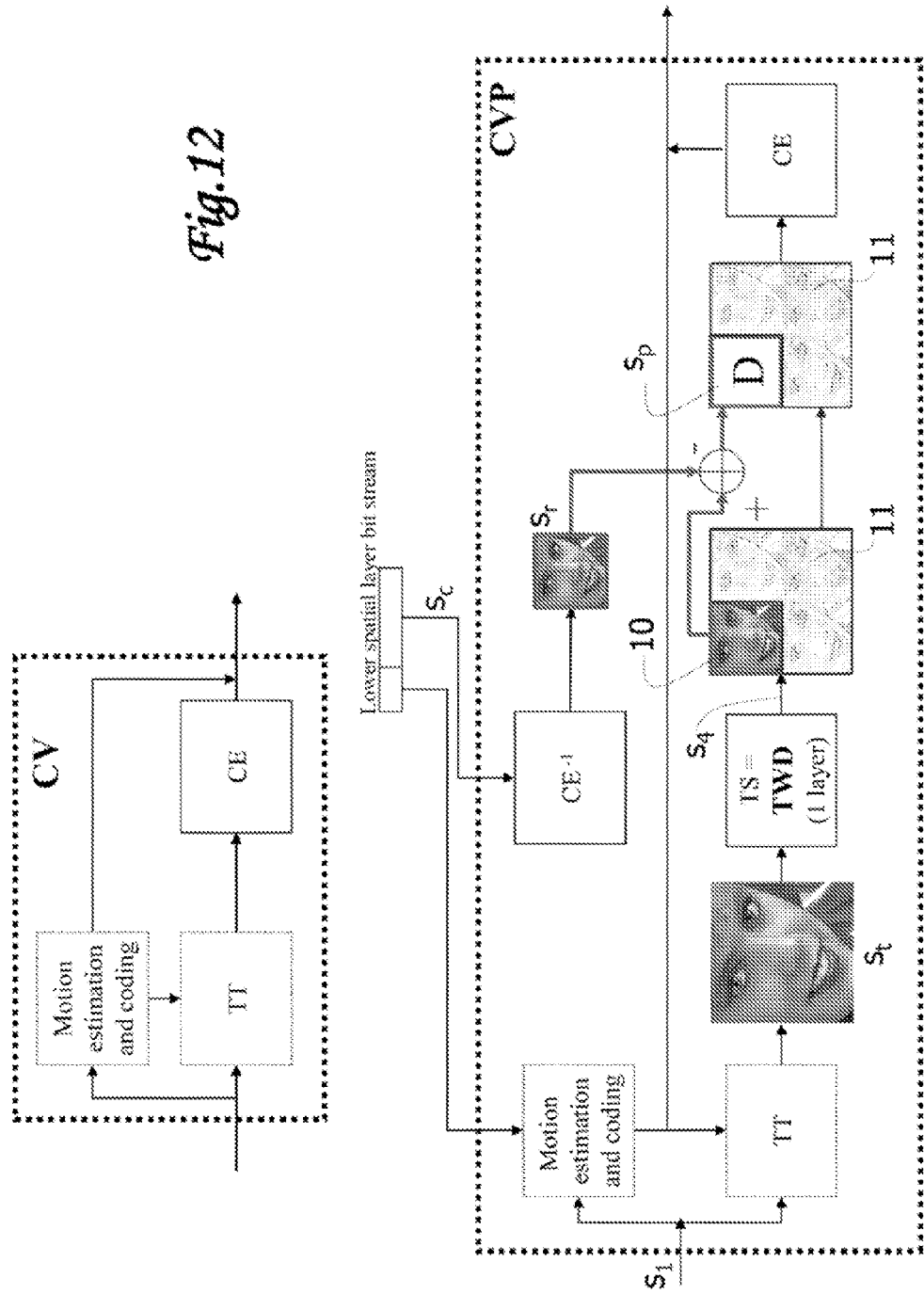
FIG. 12 shows a detailed scheme for the video coding and predictive video coding blocks of the scheme of FIG. 11.

In accordance with a favoured realization form of the method of coding and decoding, illustrated in FIGS. 11 and 12, the information to a determined layer of spatial resolution in the transformed domain is obtained through a spatial processing of the transformed information of a different layer of spatial resolution, homologous to the processing used for the generation of the video to the same different layer of spatial resolution.

More in detail, the reference video streams at the various layers of spatial resolution are obtained by the use of a spatial discrete wavelet transform (DWT, FIG. 11). In the three-layers scheme of FIG. 11, the predictive structure is still evidenced (on two prediction layers) where the inter-layer relations are intercepted by a predictive video encoder (CVP), detailed (along with the base-layer video encoder CV) in FIG. 12. Notice that the same TWD used for the spatial resolution reduction is used within the CVP (FIG. 12) in order to create low resolution spatiotemporal subbands (signal 10) directly comparable with the decoded temporal subbands at the lower resolution layer (signal Sr). In this way one can realize, in a DPCM way (that is coding the only difference), a prediction between homologous subbands.

It should be noted that the signal Sr is obtained by immediate decoding if it results from the base layer, whereas it is obtained through multiple decoding with inverse spatial transformations in the presence of intermediate layers.

As already mentioned above, the prediction mechanism can be applied on all or part of the temporally transformed signal (signal St). In the latter case, the St portion not involved in the prediction mechanism is directly addressed to the entropic quantization and coding block. Subbands between which the difference is executed are thought to be homologous in that:

1) they substantially have the same layer of spatial resolution, 2) they have undergone the same kind of space-temporal transformation, even if in the two cases the spatial and temporal transforms have been executed in a reversed order.

Figure 13:
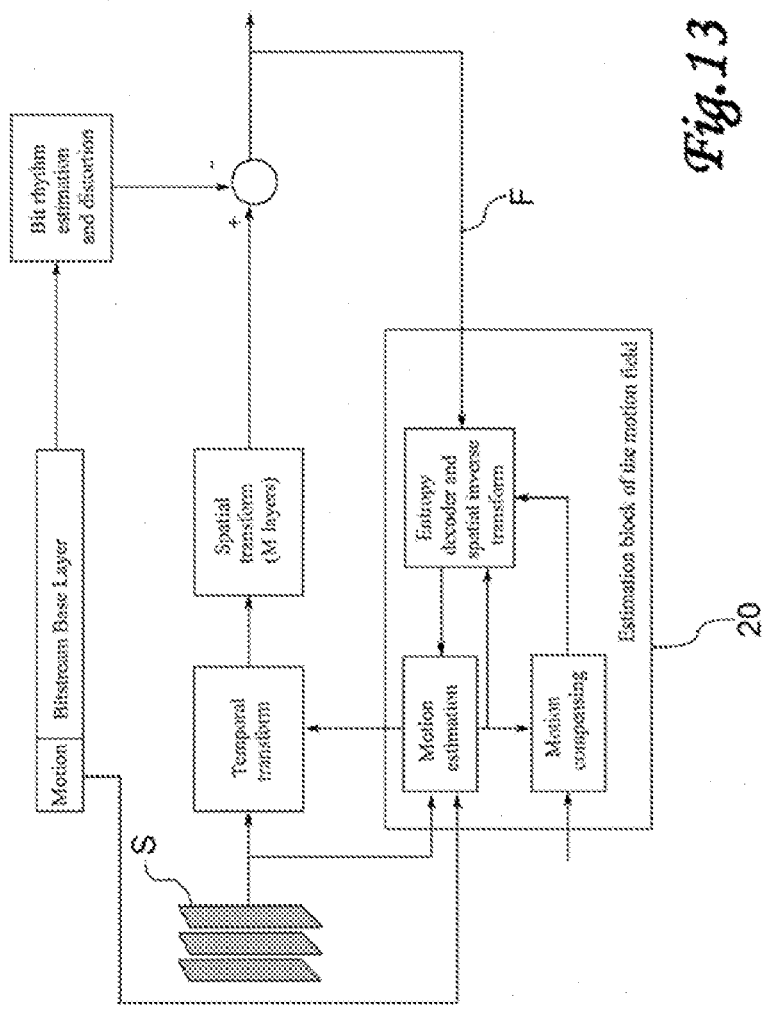
FIG. 13 represents a block diagram of a method of synchronous evaluation of the motion field.

In accordance with a preferred embodiment, the motion information used to determine the transformed domain of the video representation is obtained in a synchronous way and by refinement between at least two layers of the considered spatial resolutions. In this way, a temporal scalability of the motion vectors is obtained which exhibits advantages from the coding performance point of view. In order to obtain a good decorrelation of the temporal coefficients it is essential that the used wavelet functions are applied along sequences of homologous pixels, that is pertaining to a same object. The operation that allows to identify such sequences of pixel is the motion field estimation (block 20 in FIG. 13), that is the estimation of the parameters that describe the spatiotemporal evolution of a block of homologous pixel in the sequence S of images that must be coded.

The motion estimator to use in the base-layer coding phase can be chosen between the most performing available technical solutions, such as those used in the H.264 standard. In the higher spatial resolution layer, with respect to the base-layer, coding phase, an opportunely modified estimator that could support multi-layer motion coding, base layer plus enhancement layer, should be used. In particular, the feedback block which modifies the estimator parameters must not only take into account the distortion introduced on the original image but also the distortion introduced on the image difference in the MCTF domain, as evidenced by the arrow (f) in FIG. 13. To the aim to fulfil the above mentioned constraints, the motion field (generally consisting of a partitioning of the frame into macro blocks and of the relevant motion vector values) of the predicted spatial layer will have therefore to be coherent with the corresponding motion field estimated on the base layer.

According to another aspect of the invention, the progressive coding is obtained through a mechanism of entropic coding of the symbols obtained from the approximation of transformed frames which are related to a same layer of temporal resolution, so as to guarantee an adequate stream coding temporal scalability and in terms of quality.

After the temporal transform, the coefficients are temporally decorrelated. It can be observed that, on the whole, that is after both the temporal and spatial transformation (with or without the prediction mechanism), sets of decorrelated coefficients are generated which can be classified according their space-temporal resolution location. For the realization of a scalable video encoder either in a spatial and in a temporal and quality resolution sense it is necessary that the coded description of the coefficients is organized according to an a-priori defined prioritization. Typically, as far as the temporal scalability, the encoder will have to guarantee an exclusive access to the data at a certain temporal resolution, while as far as the quality scalability the encoder will have to guarantee a re-definable and refinable coefficient quantization layer according to the desired reproduction quality. Moreover it is desirable that this quality refinement could be carried out finely and progressively.

In this perspective, the following proposed preferential realization of the entropic coding comprises a coding system that acts jointly on same temporal resolution data and it is capable to realize a progressive refinement of the quality of the aforesaid data.

To such aim it is possible to use any still image encoder and preferably, a encoder adapted to manage groups of frames. This adaptation can regard the simple management of more than one frame or modifications made on the coefficients scanning and coding mechanisms that would benefit of the structural and statistical coherence of the frame data.

According to a preferred implementation, the above entropy coding is obtained through a symbols coding mechanism that works on a bit-plane basis on the same temporal resolution layer transformed frames.

In a more detail, the transformed coefficients (spatially, temporally or that undergo both the transformations) typically present portions of greater activity (in an energetic sense) where the aforesaid operations of linear decorrelation do not succeed to act effectively. On video data this is typically verified in correspondence of spatial or temporal discontinuities which typically characterize the objects and the relative motion properties. The use of motion-compensated temporal transforms allows increasing the temporal decorrelation degree, limiting the residual temporal discontinuities and therefore decreasing the energy of the transformed coefficients. This occurs provided that the motion model used is sufficiently accurate. In the practice, for coding efficiency and simplicity reasons, it is not possible to adopt a too complex and accurate motion model. Motion estimate systems based on the transfer of pixel blocks are typically used.

The morphologic coherence of the objects represented in the video and the relative local motion regularity determine the fact that the areas of greater activity of the transformed coefficients are typically concentrated to form spatiotemporal agglomerates (clusters) (clusterization hypothesis) at the spatial discontinuities, at the non motion-compensable residual temporal discontinuities and at the temporal discontinuities located in the areas where an accurate motion estimate cannot be obtained. Therefore, the description of the position and the value of the coefficients that is necessary to make (implicitly or explicitly) through an entropy coding algorithm, will be able to usefully take advantage of this a-priori entropic information (clusterization hypothesis) in order to increase the coding performances. It is moreover decided to take advantage of the clusterization hypothesis on the "active" coefficients according to various thresholds of activity, typically determined through the bit-planes of the binary representation of the data itself. The proposed encoder takes the name of Progressive Encoder based on Morphological Multilayer Dilation on Groups of Frames at Homogenous Temporal Resolution: CPDMM-GFRTO and is an extension to the case of video-streams of the EMDC (Embedded Morphological Dilation Coding) still image coding technique.

The input data are typically coefficients pertaining to groups of frames of same temporal layer (block "GdF"). The reason of this resides in the possibility to simply enable the temporal scalability in an effective way by simply discarding the bit-streams associated to undesired temporal layers. It is also important to group frames together so as to be able to take advantage of the statistical similarities of same temporal layer frames in order to being able to construct more reliable probability tables to the end of an eventual adaptive entropic coding of the information streams.

Figure 14:
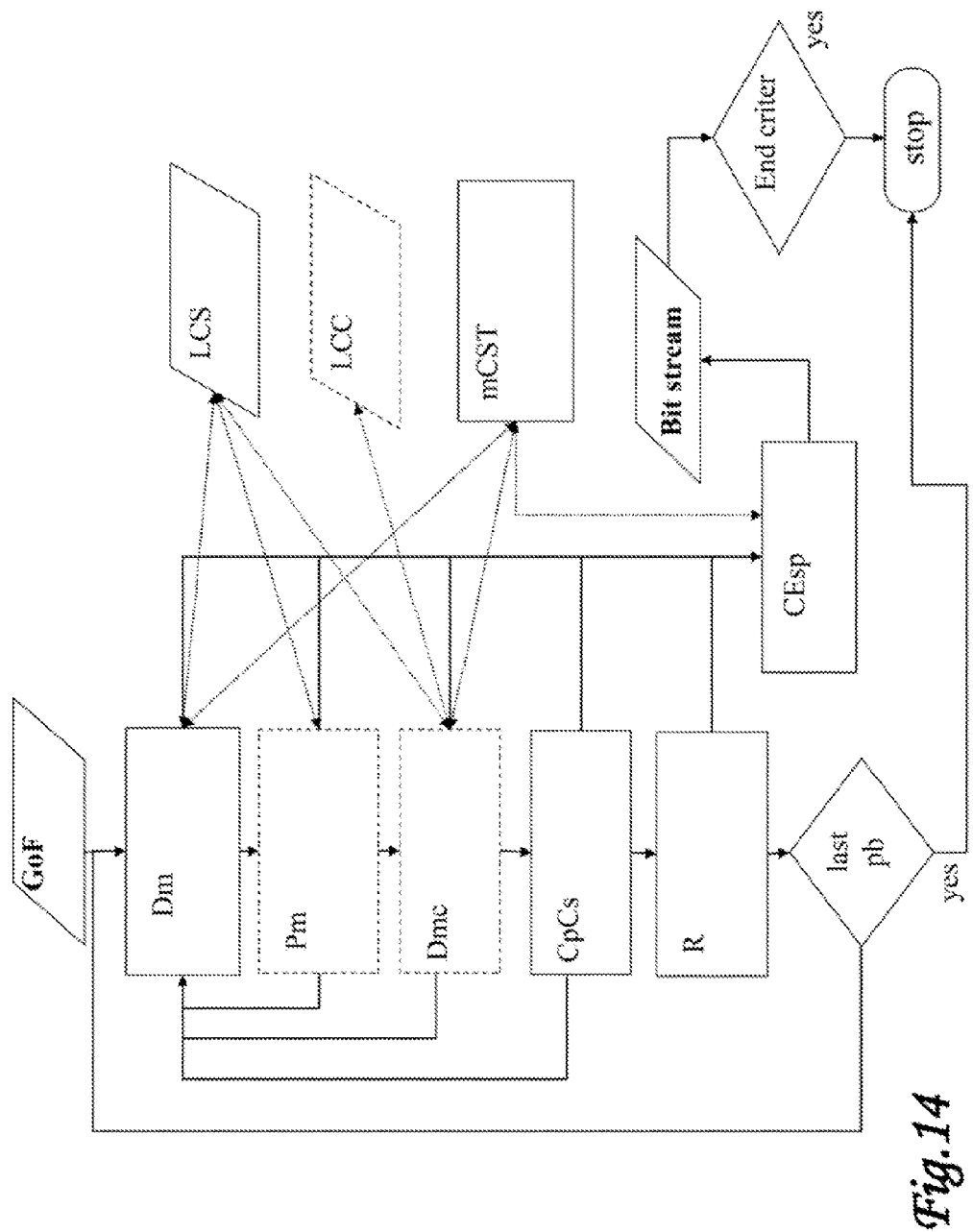
FIG. 14 is a block diagram of a progressive encoder.

The following (rectangular) functional blocks are visible in the reference diagram of FIG. 14:
Dm: morphological dilation of the clusters,
Pm: multiscale prediction,
Dme: morphological dilation of the cluster boundaries,
CpCs: coding of the significant coefficient position,
R: refinement of the coefficients relative to the current bit plane,
CEsp: lossless entropic coding (e.g. adaptive and context-based arithmetic coding),
mCST: spatiotemporal clusterization engine,
and the following data (parallelograms):
GdF: group of frames with homogeneous temporal resolution having undergone the same spatiotemporal transformation,
LCS: set of significant coefficient lists divided by each subband (or data portion related to a same spatiotemporal resolution),
LCC: set of boundary coefficient lists divided by each subband (or data portion related to a same spatiotemporal resolution),
Bit stream: is the product of CPDMM-GFRTO as regards the GdF considered.

The coding method CPDMM-GFRTO and the action of the various blocks shown in FIG. 14 shall now be described.
Initialisation and main loop: The CPDMM-GFRTO coding has a structure that iterates itself on the bit-planes so as to realize, at the same time, the progressive scanning of the map of significant coefficients and their quantization and entropic coding. To such aim two lists are managed. The main one is the list of the coefficients found significant "LCS" with respect to the threshold determined by the current bit-plane. A second list keep memory of the non-significant coefficients in the neighbourhood of significant coefficients clusters "LCC". Such lists are divided by data blocks at a homogeneous spatiotemporal decomposition layer and the algorithm CPDMM-GFRTO scans, at each bit plane, all such blocks of data according to an order deemed appropriate and determined in advance or dynamically. The lists are initialized to be empty. For the purposes of the prediction relations and of the coding uniqueness, and if not already determined, an order regarding the scan of the data blocks (typically subbands) with the same spatiotemporal resolution is decided.

Morphological dilation block ("Dm"): the coefficients of the LCS list are analyzed and a morphological dilation operation is realized around them with the objective to find clustered coefficients. Every new found significant coefficient comes added to the LCS and the analysis continues until reaching the end of the LCS. The non-significant found coefficients are necessarily on the boundaries of the analyzed clusters and are placed in the LCC list. The significance state of the coefficients and their sign information are coded.

Multiresolution prediction block ("Pm"): in the multiresolution representations they are usually present inter-band (inter-scale) dependencies from which to take advantage for a more effective compression. To this end filiation relationships can be constructed with respect to "father" coefficients at an inferior layer of resolution. In this case, once the task of the previous block is finished, new significant coefficients are searched with a priority criterion, among the possible sons of already found significant fathers. This makes the search of new (clusters of) significant coefficients more effective as compared to a simple sequential or random search. As shown in the scheme, once a new significant coefficient is found in the "Pm" step, the procedure of morphologic dilation Dm (only relating to the cluster being examined rather than the entire list LCS) is immediately recalled, in that it is that one that turns out to be more effective in terms of coding performance.

Block of morphological dilation of the borders ("Dmc"): always with reference to multiresolution representations and in particular to wavelet representations, it has been noticed that the cluster of significant coefficients often have an "archipelago" structure, that is they are agglomerate of connected coefficients (cluster) with some peripheral parts that, even not necessarily "strictly connected", are however located in the immediate vicinities of the main or considered cluster. This evidence suggests a second strategy for the search of new significant coefficients. Therefore, when the actions of the previous blocks are exhausted, new significant coefficients are not searched arbitrarily or sequentially but the boundaries of the already found clusters are first considered (the positions of such boundary coefficients are listed in the LCC) and a morphologic dilation is executed on them. Again, when a significant coefficient is found, the procedure of morphological dilation Dm (only relating to the cluster being examined rather than to the entire list LCS) is immediately launched.

Coding block of the significant coefficient position ("CpCs"): when the capability of prediction of the algorithm is exhausted, or at the beginning of the coding, it is necessary to explicitly send the coordinates of the significant coefficients. Again, when the position of a significant coefficient is coded, the procedure of morphological dilation Dm (only relating to the cluster being examined rather than to the entire list LCS) is immediately launched.

Bit-plane refinement block ("R"): once the whole significant coefficients have been determined for the current bit plane, all the coefficients found to be significant at the previous bit plane to return them to the accuracy of the current bit plane.

Lossless entropic coding block ("CEsp"): the CSsp entropic coding associated to each processing block has the role of eliminating the statistical redundancies within the chains of symbols generated by every block. Generally, given the spatiotemporal data structure, contexts based adaptive arithmetic coding techniques (selection of the probability tables according to coding state and to the state of a causal neighbourhood of coefficients of the coefficient under examination) are adopted. Each symbol issued by the described algorithm is coded through the CEsp. Even though such block can be theoretically omitted, it serves to increase the coding performance. If the block CEsp is an entropic encoder (adaptive) based on contexts, besides generating the bits relating to significance map and to the refinement values, the functional blocks must generate the information relating to the context.

STOP condition: The process finishes once caught up a STOP condition. This can be determined by the completion of a given bit-plane (ending oriented to the precision) or the achievement of the amount of assigned bit (ending oriented to the amount of available bits). Even if not explicitly indicated in the scheme, it is also possible to constantly supervise the quality of the decoded data (or an estimation of it) and to arrest the coding process on the base of a decoded data quality criterion.

Once assessed that the operation Dm is the most advantageous one, the order of the operations Pm, Dmc, CpCs and R can be modified globally or within each bit plane based on predetermined empirical observations, as described in [F. Lazzaroni, R. Leonardi and A. Signoroni—High-performance embedded morphological wavelet coding—IWDC 2002, pp. 319-326, Capri, Italy, Sep. 2002], or based on an analysis on the specific data to be coded.

Spatiotemporal clusterization engine block ("mCSP"): EMDC coding technique has been up to now only conceived for still (or fixed) data. On the contrary, through an analysis made by the block "mCSP", the CPDMM-GFRTO technique:

1) manages problems of joint coding of groups of any number of temporal frames, preferably of a same temporal layer, 2) can adapt its algorithmic structure to the characteristics of the data to be coded, as regards the type and number of spatiotemporal transformations undergone, 3) manages spatiotemporal prediction problems of significance and can adapt its algorithmic structure to the complexity requirements and to spatial scalability requirements, in particular:

3a) it can manage simple mechanisms of prediction of significant coefficient clusters among different layers of spatial resolution starting from lower spatial resolution layers, 3b) it can manage simple mechanisms of prediction of significant coefficient clusters among temporal frames starting from frames at a lower or equal spatial resolution.

The algorithm cycles on each bit-plane and considers for each functional step all the subbands according to a scanning order that can be decided freely on the group of frames, respecting the prediction principles to be used.

In the video coding, temporal subbands that might be subject to spatial transforms are coded.

The two dashed functional blocks (rectangular) (Pm and Dmc) in FIG. 14 typically intervene in case of incoming coefficients organised in a multi-resolution structure (such as if a wavelet transform is used for the spatial decorrelation, as indicated in the preferred embodiment). For representations that have not a spatial multi resolution structure, for which the clusterization hypothesis of the transformed coefficients can be applied (e.g. coefficients generated by a temporal transformation) it is possible to simply eliminate the dashed blocks Pm and Dmc.

In general, the block Pm will be eliminated when there are no inter-resolution relations to exploit.

In general, the block Dmc will be eliminated when the hypothesis of archipelago clusterization (around a main cluster there are peripheral clusters not strictly connected) is not useful for an efficient prediction and thus for an improvement of the coding performance.

An ulterior aspect of the invention regards a coding stream partitioning representation system that could be adequate to being submitted to the decoding method of the present invention.

The above system comprises indexing mechanisms that permit a coding stream partitioning with the aim of actually allowing to determine the stream that must be associated to a certain layer of quality, for a given working point in term of spatial and temporal resolution, and that possibly allow to satisfy some given maximum coding-decoding delay requirements.

In a scalable coding system, a certain portion of the higher working point related coded stream, must be "extracted" and transmitted to the decoder. The extraction operation must be simple (does not have to require decoding or transcoding operations) in that the scalability property of the coded stream must guarantee an immediate extraction with the single aid of simple heading information for the navigation and the structural scanning of the coded video stream.

Said that, at least two typologies of extraction should be considered:

1) single extraction; 2) multiple extraction.

1) single extraction: the above described extraction operation is intended as single extraction, where the extracted stream is decodable and corresponds the desired working point. From the extracted stream it is not normally possible to execute others optimal extractions to inferior working points.

2) multiple extraction: this case is referred to an extraction which preserves the necessary information in order to allow a later extraction of the widest possible subset, or alternatively, of a predetermined set, of inferior working points starting from the extracted bit-stream.

Figure 15:
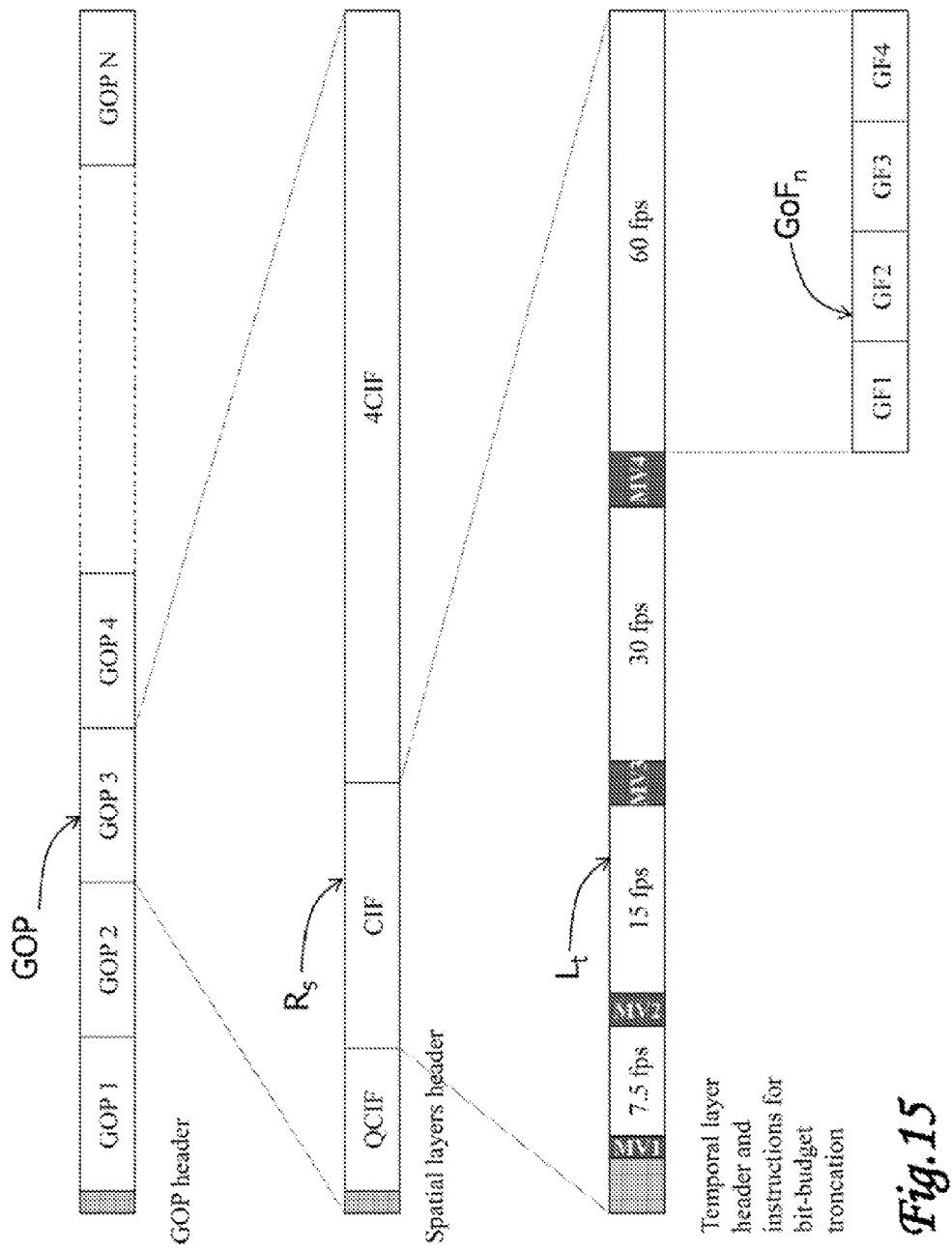
FIG. 15 shows an example of organization of a coded bit-stream.

It will be now described an example of a construction and extraction mechanism of a scalable coded video bit-stream. In particular, in the scheme of FIG. 15 an example of organization of a coded stream is proposed (block "GOP") according to a GOP (Group of Pictures) based subdivision of a whole video sequence. The first characterizing subdivision (at the GOP or whole video sequence level) is that one corresponding to the spatial resolution (block "Rs" in the example in figure, in which three spatial resolution layers are evidenced:

QCIF, CIF and 4CIF). Every spatial layer sub-stream is in turn subdivided in temporal layers (block "Lt") with the coded information relative to the motion fields associated to each of them (the example illustrates a subdivision of the CIF layer into four temporal layers). Every temporal sub-stream can be cut with a criterion directed to obtain a certain global quality or a certain global bit-rate (more common situation). While the headings for the access to the GOP and to the spatial layers only contain the positions of the beginning of stream fragments, in the case of the temporal layers, beyond to the access information, an additional information can turn out necessary to transmit in order to inform the extractor on how and where cutting the several temporal layer bit-streams to the aim to optimize the reconstruction quality for an amount of assigned bit (bit budget).

Moreover, it is possible to add an ulterior level of subdivision in groups of frames (block "GFn") of same temporal layer. Such subdivision, slightly disadvantageous in terms of coding efficiency, could reveals more useful in applications that demand a low delay between the absolute coding and decoding timings (i.e. the temporal delay, not considering transmission and computational contributions, between the frame coding time and the time when the same frame is available after its decoding). The number of subdivisions for every temporal layer depends on the desired characteristics in terms of data access and the adopted type of MCTF.

Figure 16:
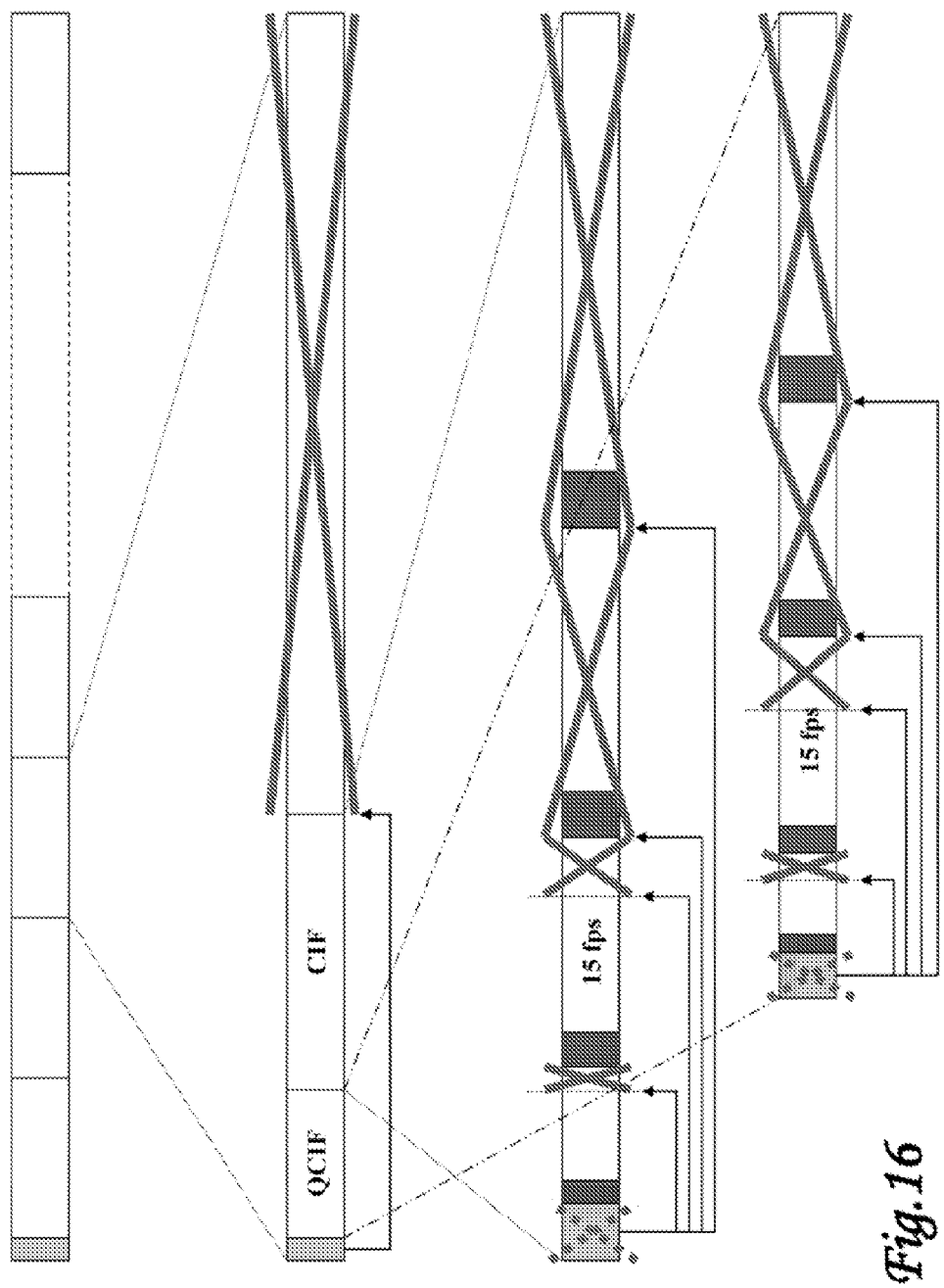
FIG. 16 represents a scheme of extraction of a bit-stream organized as indicated in FIG. 15.

In FIG. 16 an exemplification of the extractor achievement is shown. The example regards an extraction of the spatial resolution CIF at temporal frame-rate of 15 frame per second (fps) and assigned bit-rate, starting from a global bit-stream related to a 4CIF and 60 fps coding. The portions of bit-stream that are completely eliminated and those, associated to the layers to maintain, which are cut can be noticed as those crossed out. The dashed cross on the headers that contain the truncating instructions can be noticed. In fact, such elimination only happens in the case of single extraction modality.

According to a preferred embodiment, in the case of the previously described entropic coding the information that can be useful to insert in the temporal layer headings, as regards the truncation instructions, can consist in the partial lengths of the coded stream for every CPDMM-GFRTO coding step and every bit-plane. In fact, with these information, the extractor is capable to cut the sub-streams in an homogeneous and optimized way according to some distortion minimization criterion.

Figure 17:
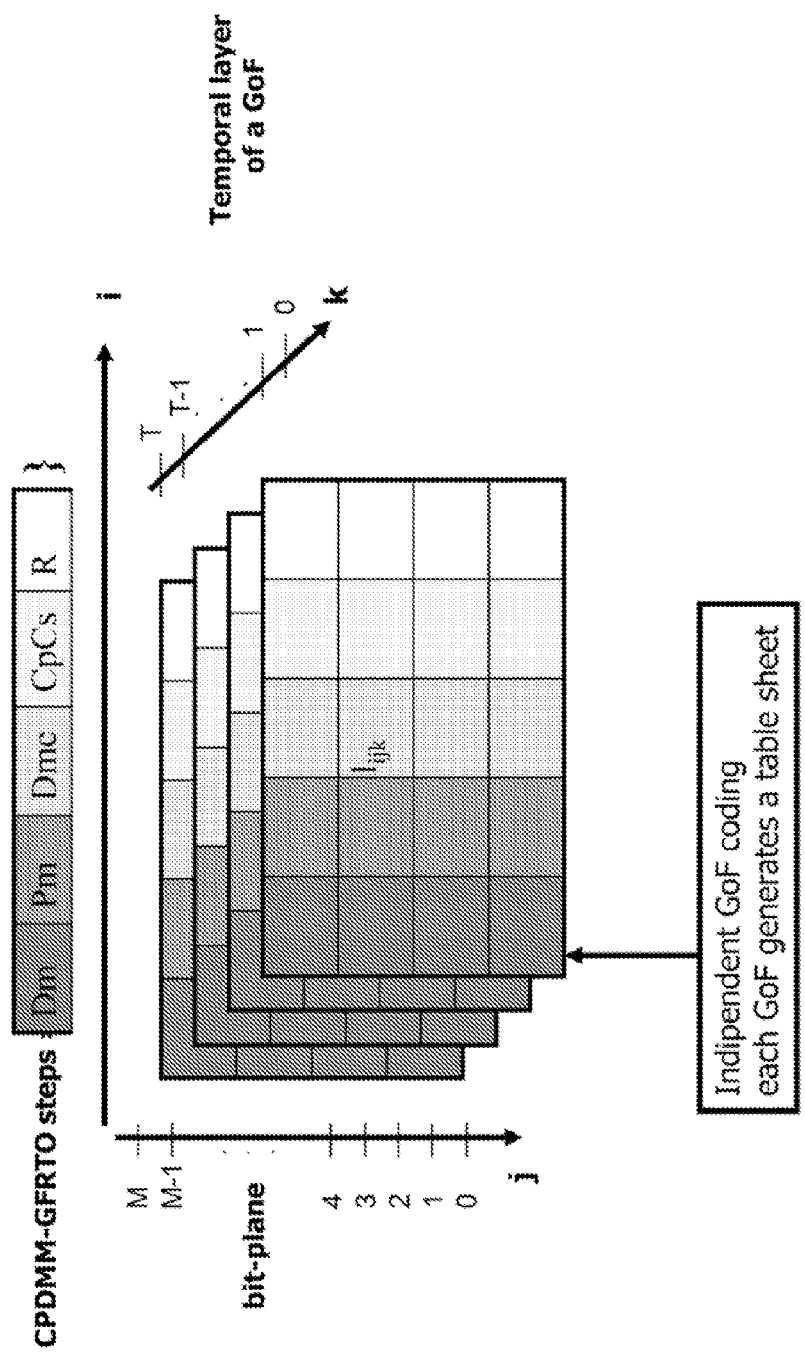
FIG. 17 shows a schematic view of a possible structure of the truncation instructions of a progressive coding method.

FIG. 17 shows a possible structure (as a three-dimensional array, that is, a set of bi-dimensional tables) of the truncation instructions referred to the coding method CPDMM-GFRTO: the coding algorithm can create the generic element $l_{ijk}$ of the table, where "i" indexes the set (or a subset A) of the coding steps of the algorithm CPDMM-GFRTO (or of another algorithm compatible with the present preferred embodiment)

"j" indexes the bit-planes (or sets of bit-plane or similar division based on a coefficient amplitude criterion) starting from the most significant ones to the least significant ones (in the example j is from M to 0), "k" determines the temporal layer of the GoF (if for each temporal layer there are multiple GoF, the index k will take a suitable vectorial form) on a range from 0 (lower temporal layer) to T (maximum temporal layer relating to the current extraction).

The generic element $l_{ijk}$ contains, in a convenient format for a compact description, the information of the length of the coded bit-stream relating to the GoF k and to the coding step determined by the two values (i,j). In particular, we shall consider the value of $l_{ijk}$ equal to the difference L(i,j),k−L(i, j)−1,k between the length of the bit-stream of the k-th GoF at the coding step (i,j) and the same length at the immediately preceding coding step "(i,j)−1" (note that the tables of each GoF in FIG. 17 are filled by lines starting from top). When the extractor has to cut on more GoF's according to an overall length constraint LC for a certain layer of spatial resolution, an advantageous method for respecting such constraint while obtaining information on the cutting lengths LT,k of the bit-streams is as follows:

```
L=0
Flag=0
for j from M to 0
  for i on the elements of A contained in {Dm,Pm,Dmc,CpCs,R}
    for k from 0 to T
      L=L+I_ijk
      If Flag = 1 then I_ijk=0
      If L greater than or equal to LC then
      I_ijk = I_ijk − (L-LC)
      Flag = 1
      end If
    end for k
  end for i
end for j
for k from 0 to T
  LT,k=summation for each (i,j) of the I_ijk
end for k
```

Following a cutting operation, the portion of tables corresponding to the cut zones can be deleted so as to minimise the occupation of the information itself.

Finally, it should be noted that with multiple extractions, or if it is necessary to make further extractions on an already extracted stream, the headers relating to the partial lengths of the coded stream are updated and stored.

The invention claimed is:

1. Encoder for coding a video signal, comprising:
    means for acquiring a first digital signal (S1) representative of a video signal, said digital signal comprising a sequence of numerical images;
    means for operating a spatial transformation (TS) of that first digital signal (S1) in order to generate at least a second digital video signal (S2) having a lower spatial resolution with respect to that of said first digital signal (S1);
    means for carrying out a motion compensated temporal transformation (TT) of the at least second digital video signal (S2) generating a third digital signal (S3), said transformation (TT) leaving substantially unchanged said spatial resolution of the second digital signal video (S2);
    means for carrying out an operation of compression (CE) of said third digital signal (S3) in order to generate a first digital compressed signal (Sc);
    means for generating a reconstructed signal (Sr) equivalent to that obtainable by means of a decompression of the said first digital compressed signal (Sc);
    means for carrying out a motion compensated temporal transform of the first digital video signal (S1) in order to generate a first temporally transformed digital signal (St);
    means for carrying out a spatial transformation (TS) of at least a portion of said first temporally transformed digital signal (St) in order to obtain a temporally-spatially transformed digital signal (S4) having a lower spatial resolution with respect to that of at least a portion of said first temporally transformed digital signal (St) comprising a first component (10) and a second component (11), where said first and second components represent in combination the same informative content of the at least a portion of said temporally transformed digital signal (St), said spatial transformation (TS) being adapted to generate said first component (10) so that it has the same spatial resolution as the third temporally transformed digital signal (S3);

means for generating a prediction error signal (Sp) representative of the difference between said first component (10) and at least a portion of the reconstructed signal (Sr) corresponding to the portion of the first temporally transformed digital signal (St); and means for carrying out an operation of compression (CE) of said prediction error signal (Sp) and of said second component (11) in order to generate a second digital compressed signal (Sc2).

2. An encoder according to claim 1, further comprising means for carrying out a motion compensated temporal transformation (TT) of the video digital signal at intermediate spatial resolution (S2(i)) generating a third temporally transformed digital signal (S3(i)), said transformation leaving said spatial resolution of the video digital signal at intermediate spatial resolution (S2(i)) unchanged;

means for carrying out a spatial transformation (TS) of at least one portion of said third temporally transformed signal (S3(i)) in order to obtain a temporally-spatially transformed digital signal (S4(i)) comprising a first component (10(i)) and a second component (11(i)), where said first and second components represent in combination the same informative content of the at least one portion of said third temporally transformed digital signal (S3(i)), said spatial transformation (TS) being adapted to generate said first component (10(i)) so that it has the same spatial resolution as the third temporally transformed digital signal (S3(i−1), where S3(0)=S3)of the preceding level;

means for generating a prediction signal (Sp(i)) representative of the difference between said first component (10(i)) and at least one portion of the reconstructed signal (Sr(i−1)), where Sr(0)=Sr) of the preceding level corresponding to the portion of the third temporally transformed digital signal (S3(i));

means for compressing said prediction error signal (Sp(i)) and said second component (11(i)) in order to generate a digital compressed signal at intermediate layer (Sc(i));

means for generating a residual reconstructed signal (Srr(i)) equivalent to that obtainable by means of a decompression of said digital compressed signal at intermediate layer (Sc(i));

means for combining said reconstructed residual signal Srr(i) and of the reconstructed signal at a previous spatial layer Sr(i−1) which preserves the layers of spatial resolution of the above signals for generating a combined signal Sb(i); and means for performing a inverse spatial transformation ($TS^{-1}$) of said combined signal Sb(i), said transformation ($TS^{-1}$) being adapted for generating a reconstructed signal at intermediate layer Sr(i) so that it has the same spatial resolution as the third temporally transformed digital signal (S3(i)).

3. An encoder according to claim 1, in which said spatial transformation is a spatial wavelet transform.

4. An encoder according to claim 1, in which said motion compensated temporal transform is a motion compensated temporal wavelet transform.

5. Encoder for coding a video signal, comprising:

means for acquiring a first digital signal (S1) representative of a video signal, said first digital signal having a first spatial resolution, said first digital signal comprising a sequence of numerical images;

means for operating a spatial transformation of said first digital signal in order to generate at least a second digital signal (S2) having a second spatial resolution, lower than the first spatial resolution;

means for operating on said first and second digital signals a motion compensated temporal transformation suitable for uncorrelating data along the temporal direction, said temporal transformation generating a first temporally transformed digital signal (St) and a second temporally transformed digital signal (S3);

means for operating a spatial transformation of said first temporally transformed digital signal (St) in order to obtain a temporally-spatially transformed digital signal (S4) comprising a first component (10) and a second component (11), the first component (10) having the same spatial resolution of the second temporally transformed digital signal (S3);

means for generating a prediction error signal (Sp) representative of the difference between said first component (10) and the second temporally transformed digital signal (S3); and means for carrying out an operation of compression (CE) of the second temporally transformed digital signal (S3), of the prediction error signal (Sp) and of the second component (11) of the fourth digital signal (S4).

6. An encoder according to claim 5, wherein, for each motion compensated temporal transformation, the conservation of the entire information regarding the related spatial resolution is provided.

7. An encoder according to claim 5, wherein different motion compensated temporal transformations are used for different layers of spatial resolution, and further comprising means for matching information regarding homologous spatial and temporal resolutions.

8. An encoder according to claim 5, wherein, in order to equalize the temporal layers to carry out the prediction(s), direct or inverse motion compensated temporal transformation of different and/or partial nature are carried out on the different layers of spatial resolution.

9. An encoder according to claim 5, where the information at a certain layer of spatial resolution in the transformed domain is obtained through a spatial processing of the transformed information at a different layer of spatial resolution, homologous to the processing used for the generation of the video at the same different layer of spatial resolution.

10. An encoder according to claim 5, where the motion information that is used in order to determine the transformed domain of the video representation is obtained in a synchronous way and by a refinement between at least two layers of the considered spatial resolutions.

11. An encoder according to claim 5, further comprising means for entropically coding symbols obtained from the approximation of the transformed frames on groups of frames relating to the same layers of temporal resolution, so as to guarantee an adequate temporal and quality scalability of the coding stream.

12. An encoder according to claim 11, where said entropic coding is obtained through a progressive coding mechanism based on bit-planes of transformed frames relating to same temporal resolution layers on which an eventual further spatial transformation is applied.

13. An encoder according to claim 12, where said entropic coding is based on a hypothesis of agglomeration of spatiotemporal trans-formed coefficients at spatial discontinuities and/or at residual not motion-compensable temporal discontinuities and/or at temporal discontinuities located in areas where it is not possible to obtain an accurate motion estimate.

14. An encoder according to claim 13, where said entropic coding provides for an exploration of said agglomeration of spatiotemporal coefficients through morphological operators that exploit the agglomeration hypothesis and the structural information present in the spatiotemporal multi-resolution domain useful for predicting further coefficients higher than a set threshold.

15. An encoder according to claim 5, further comprising means for performing a representation of the coding stream partitioning comprising indexing mechanisms that partition a coding stream in order to determine the stream that must be associated to a certain layer of quality, for a given working point in terms of spatial and temporal resolution, and to satisfy certain maximum coding-decoding delay requirements.

16. An encoder according to claim 15, wherein said indexing mechanisms insert, in the header of the temporal layers, partial lengths of the coded flow for each bit-plane.

17. An encoder according to claim 16, wherein said headers relating to the partial lengths of the coded stream are updated and stored in case of multiple extractions, or if it is necessary to make further extractions on an already extracted stream.

18. Decoder for decoding a video signal comprising:
- means for acquiring a digital signal comprising at least the first and the second digital compressed signals (Sc, Sc2; Sc', Sc2');
- means for carrying out a decompression operation ($CE^{-1}$) of the said first compressed digital signal (Sc; Sc') in order to obtain the reconstructed signal (Sr; Sr');
- means for carrying out an inverse motion compensated temporal transformation ($TT^{-1}$) of said reconstructed signal (Sr; Sr') in order to generate a decoded signal (Sd) representative of the second digital video signal (S2);
- means for carrying out an operation of decompression ($CE^{-1}$) of said second digital compressed signal (Sc2; Sc2') in order to reconstruct a signal (Sp') representative of the prediction error signal (Sp) and a signal (11') representative of the second component (11) of the temporally-spatially transformed digital signal (S4);
- means for carrying out a sum between said reconstructed prediction error signal (Sp') and at least one portion of said reconstructed signal (Sr; Sr') in order to reconstruct a signal (10') representative of the first component (10) of the temporally-spatially transformed digital signal (S4);
- means for carrying out an inverse spatial transformation ($TS^{-1}$) of said reconstructed signal components (10', 11') in order to reconstruct at least one portion of a signal (St') representative of the first temporally transformed digital signal (St); and
- means for carrying out an inverse motion compensated temporal transformation ($TT^{-1}$) of said reconstructed first temporally transformed digital signal (St') in order to generate a decoded signal (Sd1) representative of the first video digital signal (S1).

19. A decoder according to claim 18, further comprising means for acquiring additional compressed signals, and means for compressing said additional signals (Sc2(i); Sc2(i)') at intermediate spatial resolution (i) and wherein the reconstructed signal is obtained through a composition of the decompressed signals (Sp', 11') belonging to all the lower spatial resolutions and of the reconstructed signal (Sr) at the base layer.

20. A decoder according to claim 18, wherein said first, second and further compressed digital signals (Sc', Sc2') come from an extractor block (E) having the compressed digital signals (Sc, Sc2) in input.

21. A decoder according to claim 18, wherein said reconstructed signal (Sr') is a signal equivalent to said reconstructed signal.

22. An extractor device comprising:
- means for extracting streams produced by the encoder of claim 17; and
- means for updating and storing the information needed for further extractions starting from a previously extracted stream.

* * * * *